(12) United States Patent
Fowler et al.

(10) Patent No.: US 12,373,793 B2
(45) Date of Patent: *Jul. 29, 2025

(54) METHOD AND SYSTEM FOR DIGITAL RECORD VERIFICATION

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,990

(22) Filed: Apr. 29, 2024

(65) Prior Publication Data

US 2024/0281766 A1   Aug. 22, 2024

Related U.S. Application Data

(60) Continuation of application No. 17/936,186, filed on Sep. 28, 2022, now Pat. No. 11,972,396, which is a
(Continued)

(51) Int. Cl.
*G06F 16/23*       (2019.01)
*G06K 7/10*        (2006.01)
(Continued)

(52) U.S. Cl.
CPC ........... *G06Q 10/105* (2013.01); *G06F 16/23* (2019.01); *G06K 7/10297* (2013.01);
(Continued)

(58) Field of Classification Search
None
See application file for complete search history.

(56) References Cited

U.S. PATENT DOCUMENTS 6,144,304 A    11/2000  Webb
6,658,348 B2   12/2003  Rudd et al.
(Continued)

FOREIGN PATENT DOCUMENTS

EP    2254083 A1    11/2010
EP    2988260 A1    2/2016
(Continued)

OTHER PUBLICATIONS

International Search Report issued in International Application No. PCT/US2021/071461 dated Feb. 10, 2022.
(Continued)

*Primary Examiner* — Carl Adams
(74) *Attorney, Agent, or Firm* — Vos-IP, LLC

(57) ABSTRACT

A system and a method are disclosed that enable a mobile device to use an encoded tag to initiate and maintain communications with at least one remote server wherein the encoded tag is positioned to identify a point of interest, and in response to using the mobile device to scan the encoded tag, communications regarding the point of interest may be initiated such that a single encoded tag may be used to obtain and update recorded information about the point of interest, notify others about an issue related to the point of interest, log into the system, and wait to be alerted about an issue related to the point of interest and wherein if an issue relating to a point of interest has been reported, the system and method may monitor the reported issue to ensure that an action has been taken to address the reported issue.

12 Claims, 16 Drawing Sheets

Related U.S. Application Data division of application No. 17/446,298, filed on Aug. 29, 2021, now Pat. No. 11,475,409, which is a continuation-in-part of application No. 17/302,233, filed on Apr. 27, 2021, now Pat. No. 11,106,753, and a continuation-in-part of application No. 17/022,808, filed on Sep. 16, 2020, now Pat. No. 11,206,432, which is a continuation-in-part of application No. 16/155,605, filed on Oct. 9, 2018, now abandoned, which is a continuation-in-part of application No. 16/003,092, filed on Jun. 7, 2018, now abandoned.

(60) Provisional application No. 63/015,688, filed on Apr. 27, 2020, provisional application No. 62/516,644, filed on Jun. 7, 2017.

(51) Int. Cl.
*G06K 7/14* (2006.01)
*G06Q 10/105* (2023.01)
*H04L 9/40* (2022.01)

(52) U.S. Cl.
CPC ....... *G06K 7/10366* (2013.01); *G06K 7/1417* (2013.01); *H04L 63/08* (2013.01)

(56) References Cited

U.S. PATENT DOCUMENTS

| | | | |
|---|---|---|---|
| 7,379,886 B1 | 5/2008 | Zaring et al. | |
| 7,587,214 B2 | 9/2009 | Inselberg | |
| 7,817,990 B2 | 10/2010 | Pamminger et al. | |
| 8,056,802 B2 | 11/2011 | Gressel et al. | |
| 8,494,838 B2 | 7/2013 | Donabedian et al. | |
| 8,731,583 B2 | 5/2014 | Wengrovitz | |
| 8,971,861 B2 | 3/2015 | Gupta et al. | |
| 9,002,727 B2 | 4/2015 | Horowitz et al. | |
| 9,117,231 B2 | 8/2015 | Rodgers et al. | |
| 9,201,470 B2 | 12/2015 | Kim et al. | |
| 9,223,750 B2 | 12/2015 | Liu et al. | |
| 9,223,885 B2 | 12/2015 | Marsico | |
| 9,324,079 B2 | 4/2016 | Moulin et al. | |
| 9,405,844 B2 | 8/2016 | Lim et al. | |
| 9,451,389 B2 | 9/2016 | Beg et al. | |
| 9,616,338 B1 | 4/2017 | Hooper et al. | |
| 9,681,302 B2 | 6/2017 | Robinton et al. | |
| 9,767,645 B1 | 9/2017 | Cronin et al. | |
| 9,826,049 B2 | 11/2017 | Lim et al. | |
| 9,870,585 B2 | 1/2018 | Cronin et al. | |
| 9,883,344 B2 | 1/2018 | Bolton et al. | |
| 9,965,819 B1 | 5/2018 | Devries | |
| 9,977,865 B1 | 5/2018 | Laborde | |
| 10,009,429 B2 | 6/2018 | Manchado | |
| 10,127,746 B2 | 11/2018 | Bergdale et al. | |
| 10,163,124 B2 | 12/2018 | Horowitz et al. | |
| 10,178,166 B2 | 1/2019 | Sharan | |
| 10,248,905 B1 | 4/2019 | Beatty | |
| 10,594,774 B2 | 3/2020 | Thomas | |
| 10,942,913 B1 | 3/2021 | Khoyilar et al. | |
| 11,074,543 B1 | 7/2021 | Rudeegraap et al. | |
| 11,461,425 B2 * | 10/2022 | Fowler | H04L 63/08 |
| 11,468,138 B2 | 10/2022 | Fowler et al. | |
| 11,838,587 B1 | 12/2023 | Ensing | |
| 2001/0050310 A1 | 12/2001 | Rathus et al. | |
| 2002/0016816 A1 | 2/2002 | Rhoads | |
| 2003/0008661 A1 | 1/2003 | Joyce et al. | |
| 2003/0041155 A1 | 2/2003 | Nelson et al. | |
| 2003/0069827 A1 | 4/2003 | Gathman et al. | |
| 2006/0077253 A1 | 4/2006 | Vanriper et al. | |
| 2006/0094409 A1 | 5/2006 | Inselberg | |
| 2007/0209264 A1 | 9/2007 | Lau | |
| 2007/0229217 A1 | 10/2007 | Chen et al. | |
| 2009/0085724 A1 | 4/2009 | Naressi et al. | |
| 2009/0112683 A1 | 4/2009 | Hamilton, II et al. | |
| 2009/0138920 A1 | 5/2009 | Anandpura et al. | |
| 2009/0189982 A1 | 7/2009 | Tawiah | |
| 2009/0222336 A1 | 9/2009 | Etheridge, Jr. et al. | |
| 2010/0077429 A1 | 3/2010 | Kim et al. | |
| 2010/0133339 A1 | 6/2010 | Gibson et al. | |
| 2010/0184462 A1 | 7/2010 | Lapstun et al. | |
| 2010/0228577 A1 | 9/2010 | Cunningham et al. | |
| 2010/0245083 A1 | 9/2010 | Lewis | |
| 2010/0279710 A1 | 11/2010 | Dicke et al. | |
| 2011/0034252 A1 | 2/2011 | Morrison et al. | |
| 2011/0270618 A1 | 11/2011 | Banerjee et al. | |
| 2012/0011015 A1 | 1/2012 | Singh et al. | |
| 2012/0130770 A1 | 5/2012 | Heffernan | |
| 2012/0162436 A1 | 6/2012 | Cordell et al. | |
| 2012/0233237 A1 | 9/2012 | Roa et al. | |
| 2012/0265696 A1 | 10/2012 | Tuchman et al. | |
| 2012/0280784 A1 | 11/2012 | Gaviria Velez et al. | |
| 2013/0024371 A1 | 1/2013 | Hariramani et al. | |
| 2013/0043302 A1 | 2/2013 | Powlen et al. | |
| 2013/0073366 A1 | 3/2013 | Heath | |
| 2013/0080218 A1 | 3/2013 | Wildern, IV et al. | |
| 2013/0085834 A1 | 4/2013 | Witherspoon, Jr. et al. | |
| 2013/0159026 A1 | 6/2013 | Rogel et al. | |
| 2013/0166384 A1 | 6/2013 | Das | |
| 2013/0191229 A1 | 7/2013 | Rodgers et al. | |
| 2013/0218721 A1 | 8/2013 | Borhan et al. | |
| 2013/0275221 A1 | 10/2013 | Zeto, III et al. | |
| 2013/0297430 A1 | 11/2013 | Soergel | |
| 2013/0311214 A1 | 11/2013 | Marti et al. | |
| 2014/0039945 A1 | 2/2014 | Coady et al. | |
| 2014/0046802 A1 | 2/2014 | Hosein et al. | |
| 2014/0058886 A1 | 2/2014 | Gopalakrishnan et al. | |
| 2014/0156752 A1 | 6/2014 | Fetyko | |
| 2014/0217164 A1 | 8/2014 | Sweeney et al. | |
| 2014/0278592 A1 | 9/2014 | Giampapa | |
| 2014/0279072 A1 | 9/2014 | Serino | |
| 2014/0282684 A1 | 9/2014 | Keen et al. | |
| 2014/0365574 A1 | 12/2014 | Franks et al. | |
| 2015/0012307 A1 | 1/2015 | Moss | |
| 2015/0067811 A1 | 3/2015 | Agnew et al. | |
| 2015/0073879 A1 | 3/2015 | Acosta-Cazaubon | |
| 2015/0081532 A1 | 3/2015 | Lewis et al. | |
| 2015/0088658 A1 | 3/2015 | Iiduka et al. | |
| 2015/0112704 A1 | 4/2015 | Braun | |
| 2015/0120388 A1 | 4/2015 | Tan et al. | |
| 2015/0149307 A1 * | 5/2015 | Thukral | H04W 4/80 705/15 |
| 2015/0161684 A1 | 6/2015 | Raikula | |
| 2015/0199618 A1 | 7/2015 | Khan | |
| 2015/0279164 A1 | 10/2015 | Miller et al. | |
| 2015/0294392 A1 | 10/2015 | Sharon et al. | |
| 2015/0296347 A1 | 10/2015 | Roth et al. | |
| 2015/0304601 A1 | 10/2015 | Hicks et al. | |
| 2015/0348329 A1 | 12/2015 | Carre et al. | |
| 2015/0358794 A1 | 12/2015 | Nokhoudian et al. | |
| 2015/0379791 A1 | 12/2015 | Russell et al. | |
| 2016/0086228 A1 | 3/2016 | Babb et al. | |
| 2016/0104041 A1 | 4/2016 | Bowers et al. | |
| 2016/0104347 A1 | 4/2016 | Yang | |
| 2016/0132925 A1 | 5/2016 | Durst, Jr. et al. | |
| 2016/0189287 A1 | 6/2016 | Van Meter | |
| 2016/0191821 A1 | 6/2016 | Dwarakanath et al. | |
| 2016/0217258 A1 | 7/2016 | Pitroda et al. | |
| 2016/0260319 A1 | 9/2016 | Jeffery et al. | |
| 2016/0282619 A1 | 9/2016 | Oto et al. | |
| 2016/0307379 A1 | 10/2016 | Moore, Jr. et al. | |
| 2016/0335565 A1 | 11/2016 | Charriere et al. | |
| 2016/0381023 A1 | 12/2016 | Dulce et al. | |
| 2017/0039599 A1 | 2/2017 | Tunnell et al. | |
| 2017/0142460 A1 | 5/2017 | Yang et al. | |
| 2017/0250006 A1 | 8/2017 | Ovalle | |
| 2017/0308692 A1 | 10/2017 | Yano | |
| 2017/0330263 A1 | 11/2017 | Shaffer | |
| 2017/0337531 A1 | 11/2017 | Kohli | |
| 2018/0005465 A1 | 1/2018 | Truong et al. | |
| 2018/0025402 A1 | 1/2018 | Morris | |
| 2018/0026954 A1 | 1/2018 | Toepke et al. | |
| 2018/0075717 A1 | 3/2018 | Reinbold et al. | |
| 2018/0089775 A1 | 3/2018 | Frey et al. | |
| 2018/0276705 A1 | 9/2018 | Jay et al. | |

(56) References Cited

U.S. PATENT DOCUMENTS

| | | |
|---|---|---|
| 2018/0288394 A1 | 10/2018 | Aizawa |
| 2018/0330327 A1 | 11/2018 | Hertenstein et al. |
| 2018/0336286 A1 | 11/2018 | Shah |
| 2018/0353999 A1 | 12/2018 | Mcgillicuddy et al. |
| 2018/0376217 A1 | 12/2018 | Kahng et al. |
| 2019/0066063 A1 | 2/2019 | Jessamine |
| 2019/0098504 A1 | 3/2019 | Van Betsbrugge et al. |
| 2019/0130450 A1 | 5/2019 | Lamont |
| 2019/0220715 A1 | 7/2019 | Park et al. |
| 2019/0311341 A1 | 10/2019 | Rice |
| 2019/0362601 A1 | 11/2019 | Kline et al. |
| 2019/0385128 A1 | 12/2019 | Cummings |
| 2020/0035019 A1 | 1/2020 | Cappello et al. |
| 2020/0066129 A1 | 2/2020 | Galvez et al. |
| 2020/0104601 A1 | 4/2020 | Karoui et al. |
| 2020/0184547 A1 | 6/2020 | Andon et al. |
| 2020/0213006 A1 | 7/2020 | Graham et al. |
| 2020/0236278 A1 | 7/2020 | Yeung et al. |
| 2020/0320911 A1 | 10/2020 | Bruce |
| 2020/0327997 A1 | 10/2020 | Behrens et al. |
| 2020/0413152 A1 | 12/2020 | Todorovic et al. |
| 2021/0019564 A1 | 1/2021 | Zhou et al. |
| 2021/0019715 A1 | 1/2021 | Stier et al. |
| 2021/0027402 A1 | 1/2021 | Davis et al. |
| 2021/0065256 A1 | 3/2021 | Shontz |
| 2021/0118085 A1 | 4/2021 | Bushnell et al. |
| 2021/0134248 A1 | 5/2021 | Wan et al. |
| 2021/0174344 A1 | 6/2021 | Fowler et al. |
| 2021/0247947 A1 | 8/2021 | Jaynes et al. |
| 2021/0248338 A1 | 8/2021 | Spivack et al. |
| 2021/0390509 A1 | 12/2021 | Fowler et al. |
| 2021/0400313 A1 | 12/2021 | Fowler et al. |
| 2022/0060759 A1 | 2/2022 | Fowler et al. |
| 2022/0103885 A1 | 3/2022 | Sarosi et al. |
| 2022/0114228 A1 | 4/2022 | Fowler et al. |
| 2022/0116737 A1 | 4/2022 | White et al. |
| 2022/0167021 A1 | 5/2022 | French et al. |
| 2022/0172128 A1 | 6/2022 | Lore |
| 2022/0188839 A1 | 6/2022 | Andon et al. |
| 2022/0248169 A1 | 8/2022 | Bettua et al. |
| 2022/0337898 A1 | 10/2022 | Dorogusker et al. |
| 2022/0343451 A1 | 10/2022 | Fowler et al. |
| 2023/0117466 A1 | 4/2023 | Idris et al. |
| 2023/0239446 A1 | 7/2023 | Cvijanovic |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |
| WO | WO/2015/035055 A1 | 3/2015 |
| WO | WO/2016/041018 A1 | 3/2016 |
| WO | WO/2019/016602 A2 | 1/2019 |

OTHER PUBLICATIONS

International Search Report issued in International Application No. PCT/US2022/071913 dated Jun. 15, 2022.
International Search Report issued in International Application No. PCT/US2021/070471 dated Jun. 28, 2021.
International Search Report issued in International Application No. PCT/US2022/071909 dated Aug. 3, 2022.
International Search Report issued in International Application No. PCT/US2022/071912 dated Jul. 6, 2022.
International Search Report issued in International Application No. PCT/US2022/071938 dated Jul. 6, 2022.
International Search Report issued in International Application No. PCT/US2022/071906 dated Jul. 7, 2022.
International Search Report issued in International Application No. PCT/US2022/071910 dated Jul. 7, 2022.
International Search Report issued in International Application No. PCT/US2022/071908 dated Aug. 8, 2022.
International Search Report issued in International Application No. PCT/US2022/071915 dated Jul. 8, 2022.
"Blockchain", Wikipedia, Sep. 27, 2019.
"QR Codes: Here They Come, Ready or Not", Printing Tips: Precision Printing Newsletter, vol. 1, No. 1, May 2011.
"URL Redirection", Wikipedia, Mar. 21, 2021.
"Web Template System", Wikipedia, Mar. 2, 2021.
Garg, "QR Codes in Sporting Goods Companies: Eight Use Cases Across the Industry", Scanova Blog, Dec. 11, 2019, https://scanova.io/blog/qr-codes-sporting-goods-companies/.
McLaren, "Women's Beach Volleyballers Sign Deal to Display QR Code on Their Rears!", Digital Sport, Aug. 9, 2011, https://digitalsport.co/women%E2%80%99s-beach-volleyballers-sign-deal-to-display-qr-code-on-their-rears.
Muthukumar, et al., "QR Code and Biometric Based Authentication System for Trains", IOP Conference Series: Materials Science and Engineering, vol. 590, art. 012010, 2019, 1-7.
Unruh, "OU's Sooner Schooner Will Run on Field as Football Gameday Traditions Remain in New Ways: 'We Feel Like We Can Safely Do That'", The Oklahoman, Sep. 10, 2020, https://www.oklahoman.com/story/sports/columns/2020/09/10/sooner-schooner-will-run-field-football-gameday-traditions-remain-new-.
Brooks, "QR Codes: Alive and Well in the Museum?", Medium, Jun. 7, 2019, https://medium.com/whitney-digital/qr-codes-alive-and-well-47115abd234.
Cinnioğlu, "Determining the Use of QR (Quick Response) Codes in Hotels", Global Review of Research in Tourism, Hospitality & Leisure Management: An Online International (Refereed) Research Journal, vol. 5, No. 1, Jul. 10, 2019, 700-714.
Janapala, "Benefits of Using QR Codes to Collect User Feedback", G2, Aug. 13, 2019, https://learn.g2.com/qr-codes-for-feedback.

* cited by examiner

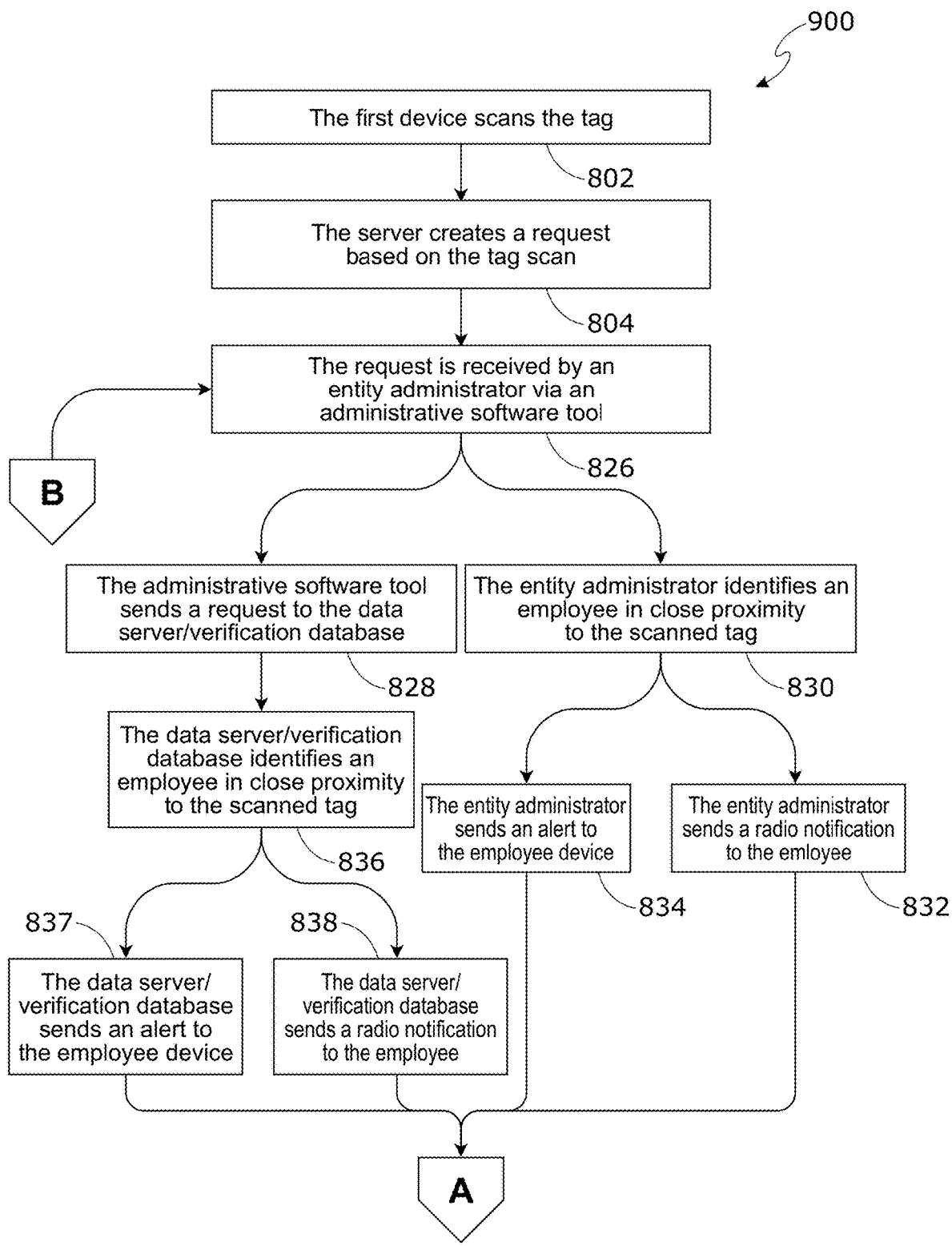

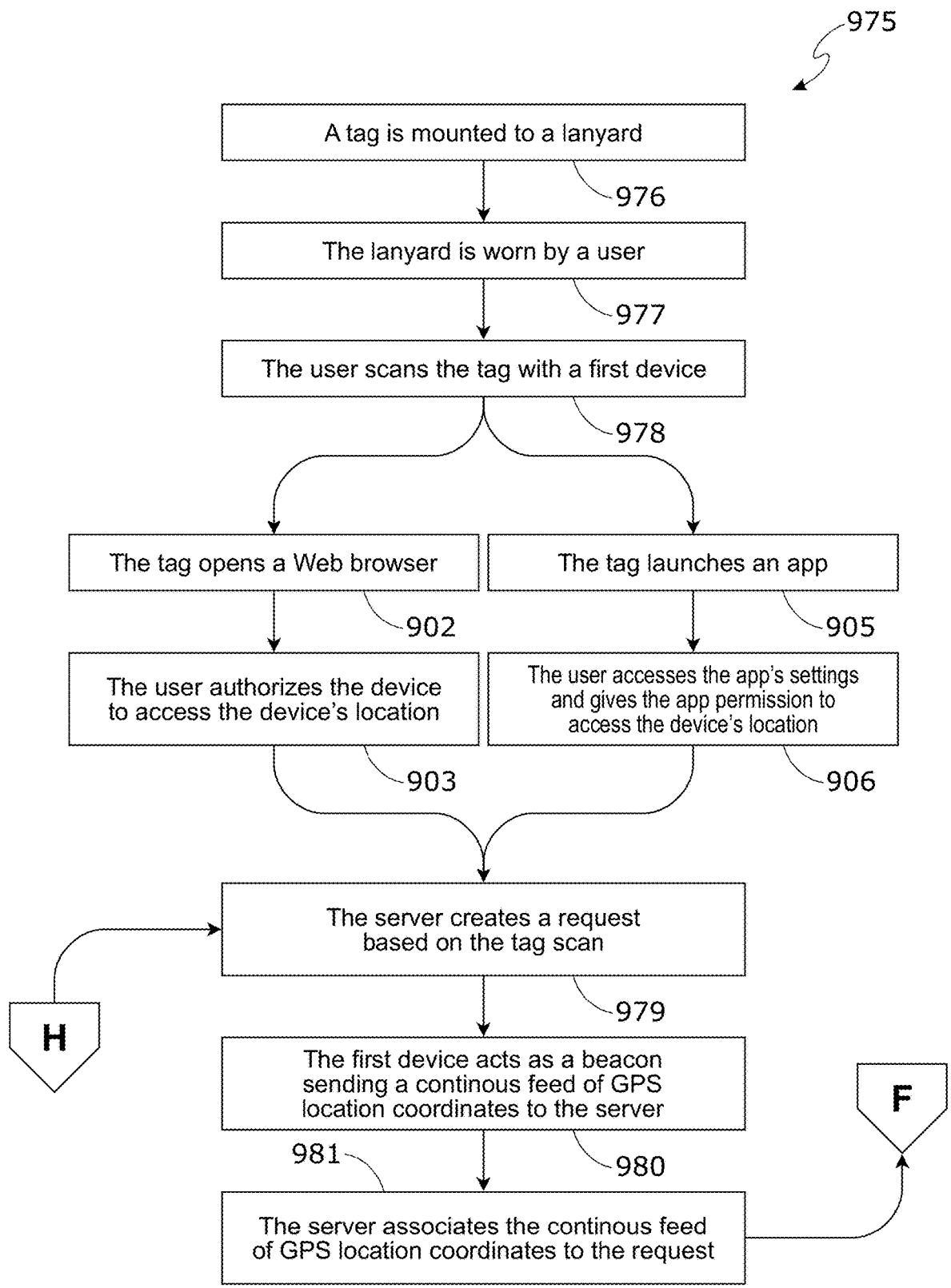

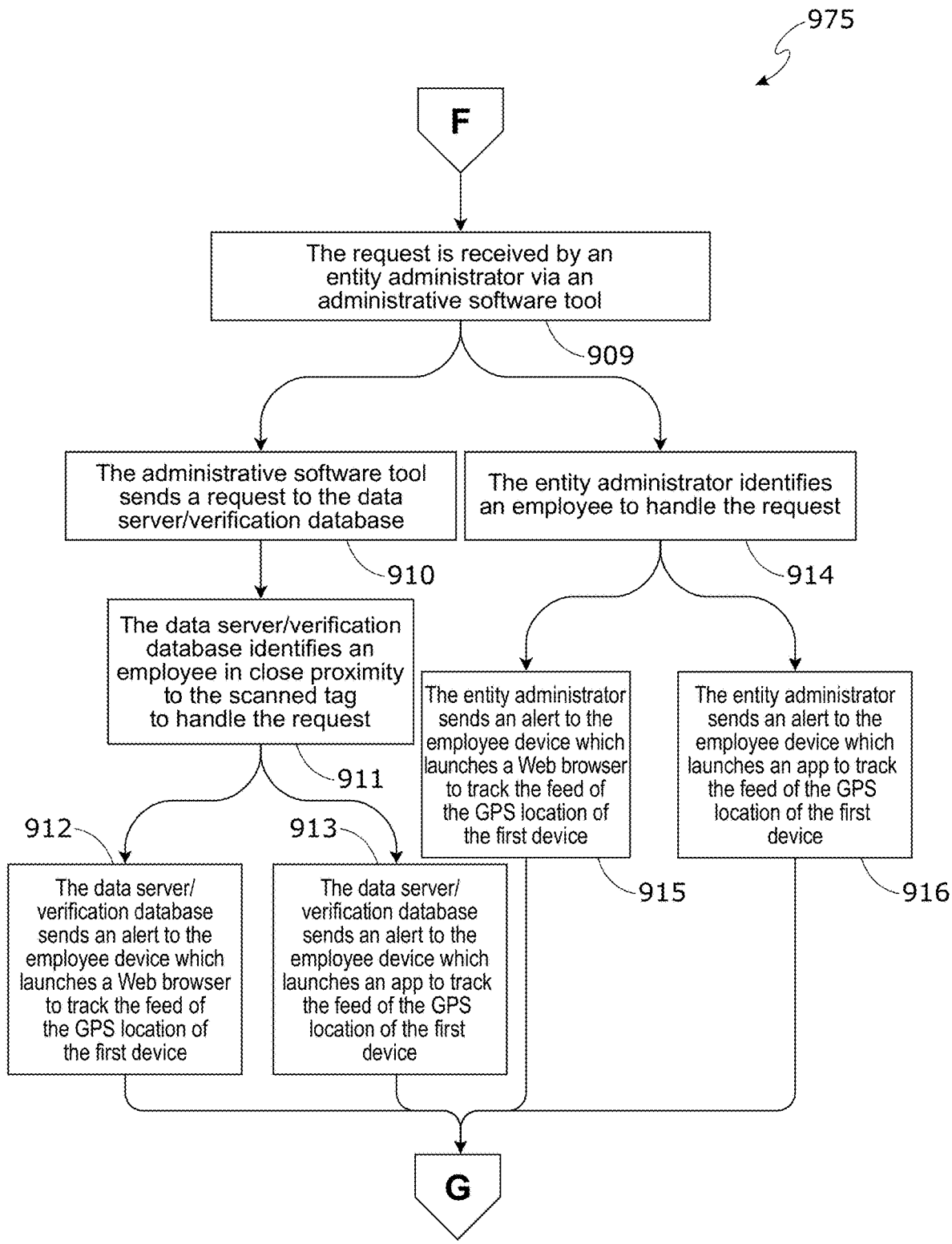

METHOD AND SYSTEM FOR DIGITAL RECORD VERIFICATION

CROSS-REFERENCE TO RELATED APPLICATIONS

This application is a continuation of U.S. patent application Ser. No. 17/936,186 filed on Sep. 28, 2022, which is a divisional of U.S. patent application Ser. No. 17/446,298 filed on Aug. 29, 2021, which is a continuation-in-part of U.S. patent application Ser. No. 17/302,233 filed on Apr. 27, 2021, which claims the benefit of U.S. Provisional Patent Application No. 63/015,688 filed on Apr. 27, 2020, with the United States Patent and Trademark Office, the contents of which are incorporated herein by reference in their entirety.

This application is further a continuation of U.S. patent application Ser. No. 17/936,186 filed on Sep. 28, 2022, which is a divisional of U.S. patent application Ser. No. 17/446,298 filed on Aug. 29, 2021, which is a continuation-in-part of U.S. patent application Ser. No. 17/022,808 filed on Sep. 16, 2020, which is a continuation-in-part of U.S. patent application Ser. No. 16/155,605 filed on Oct. 9, 2018, which is a continuation-in-part of U.S. patent application Ser. No. 16/003,092 filed on Jun. 7, 2018, which claims the benefit of U.S. Provisional Patent Application No. 62/516,644 filed on Jun. 7, 2017, with the United States Patent and Trademark Office, the contents of which are incorporated herein by reference in their entirety.

FIELD OF THE INVENTION

The present invention relates generally to methods and systems that use tags for identifying, reporting, and monitoring reporting information related to issues at a particular point of interest. The present invention also relates generally to methods and systems that use tags to enable the electronic delivery of digital records to mobile devices that have been used to scan an encoded tag located in, on, or near a point of interest.

BACKGROUND OF THE INVENTION

It is well thought out premise that there is never the help at a location when you need someone, but always someone there when you do not need them. This relates to simple things, such as a wet floor, a nonworking toilet, a health issue, a clean or not clean table at a restaurant, a hotel room, or any number of other locations where people go.

The simple issue is that there are not always enough people who are in control of the location, whether that is to keep it safe, in proper working order, to maintain its cleanliness, or for any other reason. Nor is there a simple way to communicate to someone who is responsive as to the problem or the existence of a problem.

The methods herein detail an elegant solution to these and other problems by utilizing machine-readable tags to identify a location, generate a report, and allow for members of the general public to interact as well as workers/employees to interact with a database to report, review, and update the database to solve issues.

SUMMARY OF THE INVENTION

The embodiments herein are directed to various systems and methods, specifically to identify a point of interest, whether that be the actual location, an issue happening at that location, or some other information pertaining to that point of interest, generating a request or a report regarding the same, and providing access through a single tag regarding the status of the point of interest, or providing the ability to update the status regarding the point of interest.

In a further preferred embodiment, the method receiving in the first request and the second request a tag identifier, using the tag identifier to identify a target file that when rendered on the first mobile device and the second mobile device displays the requested record, sending a uniform resource locator (URL) for the target file to the first mobile device and the second mobile device, receiving a request for the target file, and returning the target file to the first mobile device and to the second mobile device.

In a further embodiment, a system for reporting an issue that has occurred and monitoring a status of the issue, the system comprising: (a) a server having a computer processor and a computer memory; (b) a database operatively connected to the server and containing record information; (c) one or more tags, each tag having a unique tag identifier associated therewith, and each tag to identify a point of interest based on tag proximity to the point of interest that the tag identifies to link the unique tag identifier associated with the tag to a database record and to the point of interest that the tag identifies, and to convey the unique tag identifier to a mobile device that has scanned the tag, the unique tag identifier to be conveyed to the mobile device via a selection from the group consisting of: a machine-readable code, near-field communication (NFC), radio-frequency identification (RFID), and combinations thereof; and (d) wherein the computer memory of the server stores executable code, which when executed enables the server to perform a process comprising: (i) in response to receiving login credentials from a first mobile device that has scanned a first tag, update record information in the database to reflect that the first mobile device has logged in to the system; (ii) in response to receiving a request to report the issue from a second mobile device that has scanned the first tag or a second tag, update the database record linked to the unique identifier associated with the second tag to reflect that the second mobile device has reported an issue relating to the point of interest that the second tag identifies; (iii) monitor the status of the issue reported by the second mobile device by taking an action selected from the group consisting of: sending an issue alert to the first mobile device, sending an issue alert to a first responder, receiving a request to mark the issue as resolved, and combinations thereof; and (iv) update the database record linked to the unique identifier associated with the second tag to reflect the action selected.

In a further embodiment, a system for reporting an issue that has occurred within a business and monitoring a status of the issue, the system comprising: a server having a computer processor and a computer memory; a database operatively connected to the server and containing record information; one or more tags, each tag having a unique tag identifier associated therewith, and each tag to identify a point of interest based on tag proximity to the point of interest that the tag identifies to link the unique tag identifier associated with the tag to a database record and to the point of interest that the tag identifies, and to convey the unique tag identifier to a mobile device that has scanned the tag, the unique tag identifier to be conveyed to the mobile device via a selection from the group consisting of: a machine-readable code, near-field communication (NFC), radio-frequency identification (RFID), and combinations thereof; and; wherein the computer memory of the server stores executable code which, when executed, enables the server to perform a process comprising: in response to receiving a request to report the issue from a first mobile device that has scanned a tag, update the database record linked to the unique tag identifier associated with the tag to reflect that the first mobile device has reported an issue relating to the point of interest that the tag identifies and provide a notice to a second device; in response to receiving login credentials from a second device that has received the notice of an issue, generating a notification to an employee regarding the issue; receiving a response from the employee selected from the group consisting of: receiving a notice of more information needed to resolve the issues, or receiving a notice that issue is resolved; and upon resolution of the issue, updating the database record linked to the unique tag identifier associated with the tag to reflect the resolution of the issue.

In a further embodiment, the system wherein the server is to perform a process comprising receiving a request from a third mobile device for the database record linked to the unique tag identifier associated with the tag that reflects that the issue reported by the first mobile device has been resolved and in response thereto providing the database record linked to the unique tag identifier associated with the tag that reflects that the issue reported by the first mobile device has been resolved to the third mobile device.

In a further embodiment, the system wherein, in response to receiving login credentials from a second device that has scanned the tag, updating the database record associated with the tag wherein the tag is identified as a master tag and updating a database record associated with a servant tag grouped with the master tag.

In a further embodiment, they system wherein an administrator assigns an employee to resolve the issue and wherein the administrator updates the database upon resolution of an issue.

In a further preferred embodiment, the system wherein monitoring the status of the issue reported by the second mobile device includes receiving a request from the first mobile device to mark the issue as resolved, updating the database record linked to the unique identifier associated with the second tag to reflect that the issue reported by the second mobile device has been resolved, and sending a message to the second mobile device indicating that the issue reported by the second mobile device has been resolved.

In a further preferred embodiment, the system wherein the server is to perform a process comprising receiving a request from a third mobile device for the database record linked to the unique tag identifier associated with the second tag that reflects that the issue reported by the second mobile device has been resolved and in response thereto providing the database record linked to the unique tag identifier associated with the second tag that reflects that the issue reported by the second mobile device has been resolved to the third mobile device.

In a further preferred embodiment, the system wherein in response to receiving login credentials from a first mobile device that has scanned the first tag updating the database record associated with the first tag wherein the first tag is identified as a master tag and updating a database record associated with a servant tag grouped with the master tag.

In a further preferred embodiment, a method for reporting an occurrence of an issue in a dormitory and monitoring the status of a reported issue comprising: in response to receiving a request to report the issue from a first mobile device that has scanned a tag located on, in, or near a dormitory door, updating a database record associated with the dormitory door and identified by a unique tag identifier that was received by the first mobile device when the first mobile device scanned the tag to reflect that the first mobile device reported the issue; sending an issue alert to the second mobile device; in response to receiving login credentials from a second mobile device, updating a database record to reflect that the second mobile device is logged in; receiving a request to update the database record associated with the dormitory door from the second mobile device, the request to update the database record associated with the dormitory door received from the second mobile device selected from the group consisting of: receiving a notice that an action has been taken to resolve the reported issue, receiving a request to mark the issue as resolved, receiving a notice that emergency services have been contacted, and combinations thereof; and in response to receiving the request to update the database record associated with the dormitory door from the second mobile device, updating the record according to the type of request received.

In a further embodiment, a method for reporting an occurrence of an issue within a health care facility and monitoring the status of the reported issue comprising: in response to receiving a request to report the issue from a first mobile device that has scanned a tag located on, in, or near a bed in the health care facility, updating a database record corresponding to the bed and identified by a unique tag identifier to reflect that the first mobile device reported the issue, the unique tag identifier received in the request to report the issue and obtained by the first mobile device when the first mobile device scanned the tag; detecting that a second mobile device has scanned a tag identifying a door leading to a patient room; after detecting that the second mobile device has scanned the tag identifying the door, receiving login credentials from the second mobile device; updating a database that includes the database record corresponding to the bed to reflect that the second mobile device is logged in; sending an issue alert regarding the reported issue to the second mobile device; and updating the database record corresponding to the bed to reflect that the issue alert has been sent to the second mobile device.

In a further preferred embodiment, the method further comprising the step of receiving, from the second mobile device, a request to update the database record corresponding to the bed selected from the group consisting of: receiving a notice that an action has been taken to resolve the reported issue and receiving a request to mark the reported issue as resolved, and in response thereto, updating the database record corresponding to the bed according to the type of request to update the database record corresponding to the bed was received by the second mobile device.

In a further embodiment, a method for reporting an occurrence of an issue in a stadium, and monitoring the status of a reported issue comprising: in response to receiving a request to report the issue from a first mobile device that has scanned a tag located on, in, or near a first point of interest in the stadium, updating a database record corresponding to the first point of interest and identified by a unique tag identifier to reflect that the first mobile device reported the issue, the unique tag identifier received in the request to report the issue and obtained by the first mobile device when the first mobile device scanned the tag; detecting that a second mobile device has scanned a tag identifying a second point of interest; after detecting that the second mobile device has scanned the tag identifying a second point of interest, receiving login credentials from the second mobile device; updating a database that includes the database record corresponding to the first point of interest to reflect that the second mobile device is logged in; sending, to the second mobile device, an issue alert regarding the issue reported by the first mobile device; updating the database record corresponding to the first point of interest to reflect that the issue alert has been sent to the second mobile device; resolving the issue; and in response to receiving, from the second mobile device, a request to update the database record corresponding to the first point of interest, updating the database record corresponding to the first point of interest to reflect that the issue reported by the first mobile device has been resolved.

In a further embodiment, the method further comprising, in response to receiving a request from a third mobile device for the database record corresponding to the first point of interest, providing the updated database record corresponding to the first point of interest that reflects that the issue reported by the first mobile device has been resolved, wherein the request from the third mobile device was received in response to using the third mobile device to scan the tag located on, in, or near the first point of interest in the stadium.

In a further embodiment, a method of using a plurality of tags that are quick response code (QR)-enabled, near-field communication (NFC)-enabled, or both to provide a database record to a mobile device comprising: assigning each tag in the plurality of tags to a different point of interest; each tag in the plurality associated with a unique tag identifier that links a database record identifiable by the unique tag identifier to the point of interest to which the tag was assigned; monitoring for access to an application by a first mobile device, access to the application by the first mobile device occurring in response to using the first mobile device to scan one tag in the plurality of tags, the application to use the unique tag identifier associated with the one tag to provide content, including the database record identified by the unique tag identifier associated with the one tag, to the first mobile device; monitoring for the database record identified by the unique tag identifier associated with the one tag to be updated via the first mobile device; monitoring for input from a second mobile that has accessed the application in response to using the second mobile device to scan the same tag or a different tag in the plurality as the first mobile device tag; and sending a message to the first mobile device, or the second mobile device, or both.

In a further preferred embodiment, the method further comprising grouping tags in the plurality, one of the tags in the group being a master tag and the remaining tags in the group being servant tags, such that when a database record identifiable by the unique tag identifier associated with the master tag is updated, all of the database records associated with servant tags in the group are automatically updated.

In a further preferred embodiment, the method wherein monitoring for input from a second mobile that has accessed the application includes monitoring for input from a second mobile selected from the group consisting of: a request for sanitization, a request for maintenance, a request to purchase a product, a request for a free product, a request for assistance, a request for emergency services, a request to check out, and combinations thereof.

In a further preferred embodiment, the method wherein sending a message to the first mobile device, or the second mobile device, or both includes sending messages selected from the group consisting of: a short message services message, a multimedia message services message, a message transmitted through a wireless application protocol, an email message, a live phone call, a voicemail message, and combinations thereof.

In a further preferred embodiment, the method further comprising forming a network of tags from the plurality of tags owned by an entity selected from the group consisting of: a restaurant, a hotel, an educational campus, a work campus, an airline, a rideshare organization, a health care facility, a manufacturing business, entertainment businesses, mining, oil and gas extraction, and a sports facility.

In a further preferred embodiment, the method wherein assigning each tag in a plurality of tags to a different point of interest includes causing each tag in the plurality to be physically located on, in, or near the point of interest to which it is assigned, digitally displayed on a display device that is physically on, in, or near the point of interest to which it is assigned, or both.

In a further embodiment, a method for reporting an occurrence of an issue relating to a point of interest in a business comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) sending a notification to at least a second mobile device; (c) after receiving login credentials from said at least second mobile device, receiving a request from the second mobile device to mark the issue reported by the first mobile device as resolved; and (d) updating the database record corresponding to the point of interest to reflect that the reported issue is resolved. In a preferred embodiment, wherein the notification comprises a link to the issue, wherein login can be generated from the notification, and the database updated from the same notification. In certain embodiments, the link assumes authorization and no login is required, only the unique link is sufficient to reach a screen to elect to resolve the issue or otherwise opens a portal an provides a field to select additional requirements needed to resolve the issue.

In a further embodiment, a method for reporting an occurrence of an issue relating to a point of interest in a business comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) sending a notification to at least a second mobile device; (c) after receiving login credentials from said at least second mobile device, receiving a request from the second mobile device to mark the issue reported by the first mobile device as resolved; and (d) transmitting a notification of the issue being resolved to an administrator; and (e) updating the database record corresponding to the point of interest to reflect that the reported issue is resolved. In a preferred embodiment, the method wherein the administrator controls the at least second mobile device. In a preferred embodiment, the method wherein the administrator remotely updates the database record regarding the issue being resolved. In a preferred embodiment, the second mobile device is an administrative computer. In a preferred embodiment, the administrator provides the notification to a third mobile device, corresponding to a person who is resolving the issue. In a preferred embodiment, the administrator communicates via SMS or radio with a person/employee resolving the issue. In a preferred embodiment, the administrator provides notifications and resolves issues from a computer, whether or not it is a mobile device.

In a further embodiment, certain items in a business may be difficult to locate by a repair person or an employee, but have a known, static location. Accordingly, a method for reporting an occurrence of an issue relating to a item having a static location in a business: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) sending a notification to at least a second mobile device comprising the known location of the item; (c) generating a directional orientation within said second mobile device to the known location of the item; (d) after receiving login credentials from said at least second mobile device, receiving a request from the second mobile device to mark the issue reported by the first mobile device as resolved; and (e) updating the database record corresponding to the point of interest to reflect that the reported issue is resolved. In a preferred embodiment, an administrator remotely resolves the issue within the database. In a preferred embodiment, wherein the administrator generates the notice to a third device to perform work on the item having a known location. In a preferred embodiment, the second mobile device is an administrative computer. In a preferred embodiment, the administrator provides the notification to a third mobile device, corresponding to a person who is resolving the issue. In a preferred embodiment, the administrator communicates via SMS or radio with a person resolving the issue.

In a further embodiment, a method for reporting an occurrence of an issue relating to a point of interest in a business comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) sending a notification to at least a second mobile device; (c) opening the notification on said second mobile device, and generating a link to resolve or request more information by said second mobile device; (d) updating the database record corresponding to the point of interest to reflect that the reported issue is addressed by the second mobile device. In a preferred embodiment, wherein the notification comprises a link to the issue, wherein login can be generated from the notification, and the database updated from the same notification. In further embodiments, the link opens a portal or selectable fields to resolve or provide additional feedback regarding the issue, if not resolved. In a further embodiment, the link itself is sufficient to open the portal or to resolve without the need to log in.

In a further embodiment, a movable object is provided with a tag, and provides for geolocation to the tagged movable object using the mobile device which scanned the tag to become a location beacon. The method for a method for reporting an occurrence of an issue relating to a movable object comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) generating a location beacon from the first mobile device; (c) sending a notification to at least a second mobile device comprising a link to said issue; (d) generating a directional orientation from the second mobile device to the location of the first mobile device; (e) updating the database record corresponding to the point of interest to reflect that the reported issue is resolved. In a preferred embodiment, wherein the link to the issue provides a login access and the database can be updated from the same notification. In certain embodiments, the link assumes authorization and no login is required, only the unique link is sufficient to reach a screen to elect to resolve the issue or otherwise opens a portal an provides a field to select additional requirements needed to resolve the issue.

In a preferred embodiment, a method for reporting an occurrence of an issue relating to a point of interest in a business comprising: (a) receiving a request to report the issue from a first mobile device that has scanned a tag located on or near the point of interest; (b) updating a database record corresponding to the point of interest and identified by a unique tag identifier that was received by the first mobile device when the first mobile device scanned the tag to reflect that the issue was reported by the first mobile device; (c) sending a notification to at least a second device regarding the issue; (d) after receiving login credentials from said second device, receiving confirmation of resolution of the issue; (e) receiving a request from the second device to mark the issue reported by the first mobile device as resolved; and (f) updating the database record corresponding to the point of interest to reflect that the issue is resolved.

In a further preferred embodiment, the method wherein the notification comprises a link to a portal which identifies the issue, wherein login can be authorized from the notification, and the database record is updated from the same notification.

In a further preferred embodiment, the method further comprising before receiving login credentials from the second device, scanning any tag within the business by the second device. In a further preferred embodiment, the method wherein the second device scans a tag which is a master tag and updating the database record associated with the master tag and a record associated with a servant tag grouped with the master tag.

In a further preferred embodiment, the method further comprising receiving a report relating to the point of interest from the first mobile device, the report regarding a medical issue, an object, an area, and a person, and designating a status for the report as unresolved. In a further preferred embodiment, the method further comprising determining what the report is and sending an alert regarding the issue to a group consisting of: the second device, an administrator, a third mobile device, a first responder, and combinations thereof. In a further preferred embodiment, the method further comprising completing a task to address the report relating to the point of interest and changing the status for the report relating to the point of interest from unresolved to resolved.

In a further preferred embodiment, the method further comprising receiving a tag identifier in the request and using the tag identifier to identify a target file that when rendered on the first mobile device or the second device displays the database record requested, sending a uniform resource locator (URL) for the target file to the first mobile device or the second device, receiving a request for the target file, and returning the target file to the first mobile device or to the second device.

In a further preferred embodiment, the method wherein receiving the request for the database record includes receiving a request for a record selected from the group consisting of: a sanitization record, a health record, a safety record, an incident record, and a maintenance record.

In a further preferred embodiment, the method wherein providing the database record requested includes providing a verified record from a blockchain ledger.

In a further preferred embodiment, the method wherein receiving the request for issue includes receiving the request for the database record and, in response to using the respective first mobile device and second device to scan the tag, wherein the tag includes a code embedded in a near-field communications (NFC) chip, a code embedded in a quick response (QR) code, or both, the code including a uniform resource locator (URL) with an identifier for identifying the tag including the code and a point of interest selected from the group consisting of: an object, an area, a person near the object or area, and combinations thereof.

In a preferred embodiment, a method for reporting an occurrence of an issue relating to a point of interest in a business comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device and sending a notice to a second device; (b) receiving the notice by an administrator on said second device; (c) accessing the unique tag identifier via the second device by accessing the notice or by scanning a tag; (d) after confirming login credentials from the second device, receiving a request from the second device to assign an employee to resolve the issue; (e) generating a second notice to an employee to resolve the issue; (f) receiving a communication from the employee that the issue is resolved; (g) using the unique tag identifier received from the second device to locate the database record corresponding to the point of interest; and (h) updating the database record corresponding to the point of interest to reflect that the issue is resolved.

In a further preferred embodiment, the method wherein the request to report the issue is a request to report an issue selected from the group consisting of: a cleaning issue, a maintenance issue, a request for a missing item, a request for an additional item, a request for medical assistance, a request for room service, and combinations thereof.

In a further preferred embodiment, the method wherein the notice comprises a link to a portal identifying the issue. In a further preferred embodiment, the method wherein the notice comprises a link to the issue, wherein login can be generated from the notice and the database record updated from the same notice. In a further preferred embodiment, the method wherein the link is a unique link and access to the unique link is sufficient to reach a screen portal to elect to resolve the issue or otherwise provides a field to select additional requirements needed to resolve the issue.

In a preferred embodiment, a method for reporting an occurrence of an issue relating to a point of interest in a business comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) sending a notification to at least a second device; (c) after receiving login credentials from said second device, receiving a request from the second device to mark the issue reported by the first mobile device as resolved; (d) transmitting a notification of the issue being resolved to an administrator; and (e) updating the database record corresponding to the point of interest to reflect that the issue is resolved.

In a further preferred embodiment, the method wherein up receipt of the notification, scanning any tag by the at least second device to provide login credentials.

In a further preferred embodiment, the method wherein the administrator remotely updates the database record regarding the issue being resolved.

In a further preferred embodiment, the method wherein the second device is an administrative computer.

In a further preferred embodiment, the method wherein the administrator provides the notification to a third mobile device corresponding to a person who is resolving the issue.

In a further preferred embodiment, the method wherein the administrator communicates via SMS or radio with a person resolving the issue.

In a further preferred embodiment, the method wherein the administrator provides notifications and resolves issues from a computer, whether or not it is a mobile device.

In a preferred embodiment, a method for reporting an occurrence of an issue relating to an object having a known static location in a business comprising: (a) in response to receiving a request to report the issue from a first mobile device that has scanned a tag located on or near the object, updating a database record corresponding to the object and identified by a unique tag identifier that was received by the first mobile device when the first mobile device scanned the tag to reflect that the issue was reported by the first mobile device; (b) sending a notification to at least a second device comprising the known static location of the object; (c) after receiving login credentials from said second device, receiving a request from the second device to resolve the issue relating to the object; (d) generating a directional orientation within said second device to the known static location of the object; (e) resolving the issue relating to the object; and (f) updating the database record corresponding to the object to reflect that the issue is resolved.

In a further preferred embodiment, the method wherein the second device is used by an administrator, and wherein the administrator remotely resolves the issue within the database record. In a further preferred embodiment, the method wherein the administrator generates the notification to a third device to perform work on the object having a known static location.

In a further preferred embodiment, the method wherein the second device is an administrative computer used by an administrator. In a further preferred embodiment, the method wherein the administrator provides the notification to a third mobile device corresponding to a person who is resolving the issue. In a further preferred embodiment, the method wherein the administrator communicates via SMS or radio with the person resolving the issue.

In a further embodiment, a movable object is provided with a tag and provides for geolocation to the tagged movable object, the method comprising: a method for reporting an occurrence of an issue relating to a movable object comprising: (a) in response to receiving a request to report the issue from a first mobile device that has scanned a tag located on or near the movable object, updating a database record corresponding to the movable object and identified by a unique tag identifier that was received by the first mobile device when the first mobile device scanned the tag to reflect that the issue was reported by the first mobile device; (b) recording a location of the movable object in response to reporting the issue; (c) sending a notification to at least a second device comprising a link to access information regarding said issue; (d) generating a directional orientation from the second device to the location of the movable object; and (e) updating the database record corresponding to the movable object that the issue is resolved.

In a further preferred embodiment, the method wherein the link to the issue provides a login access and the database record can be updated from the same notification.

In a further preferred embodiment, the method wherein the link is a unique link and wherein when the link is accessed authorization is assumed. In certain embodiments, the unique link is sufficient to reach a screen to elect to resolve the issue or otherwise open a portal and provide a field to select additional requirements needed to resolve the issue.

In a further embodiment, a method for resolving an occurrence of an issue relating to a point of interest in a business comprising: (a) in response to receiving a request to report the issue from a first mobile device that has scanned a tag located on or near the point of interest, updating a database record corresponding to the point of interest and identified by a unique tag identifier that was received by the first mobile device when the first mobile device scanned the tag to reflect that the issue was reported by the first mobile device; (b) sending a notification to at least a second mobile device; (c) scanning any tag by said at least second mobile device; (d) generating a list of issues to said at least second mobile device; (e) after receiving login credentials from said at least second mobile device, receiving a request from the second mobile device to mark an issue as resolved; and (f) updating the database record corresponding to the issue.

BRIEF DESCRIPTION OF THE FIGURES

FIGS. 9A and 9B depicts a flow diagram wherein an administrator engages with an employee and the database to resolve a request.

FIGS. 11A-11C depict a flow diagram regarding a tag mounted on a movable device, wherein the mobile device becomes a beacon for location positioning.

DETAILED DESCRIPTION OF THE INVENTION

Figure 1:
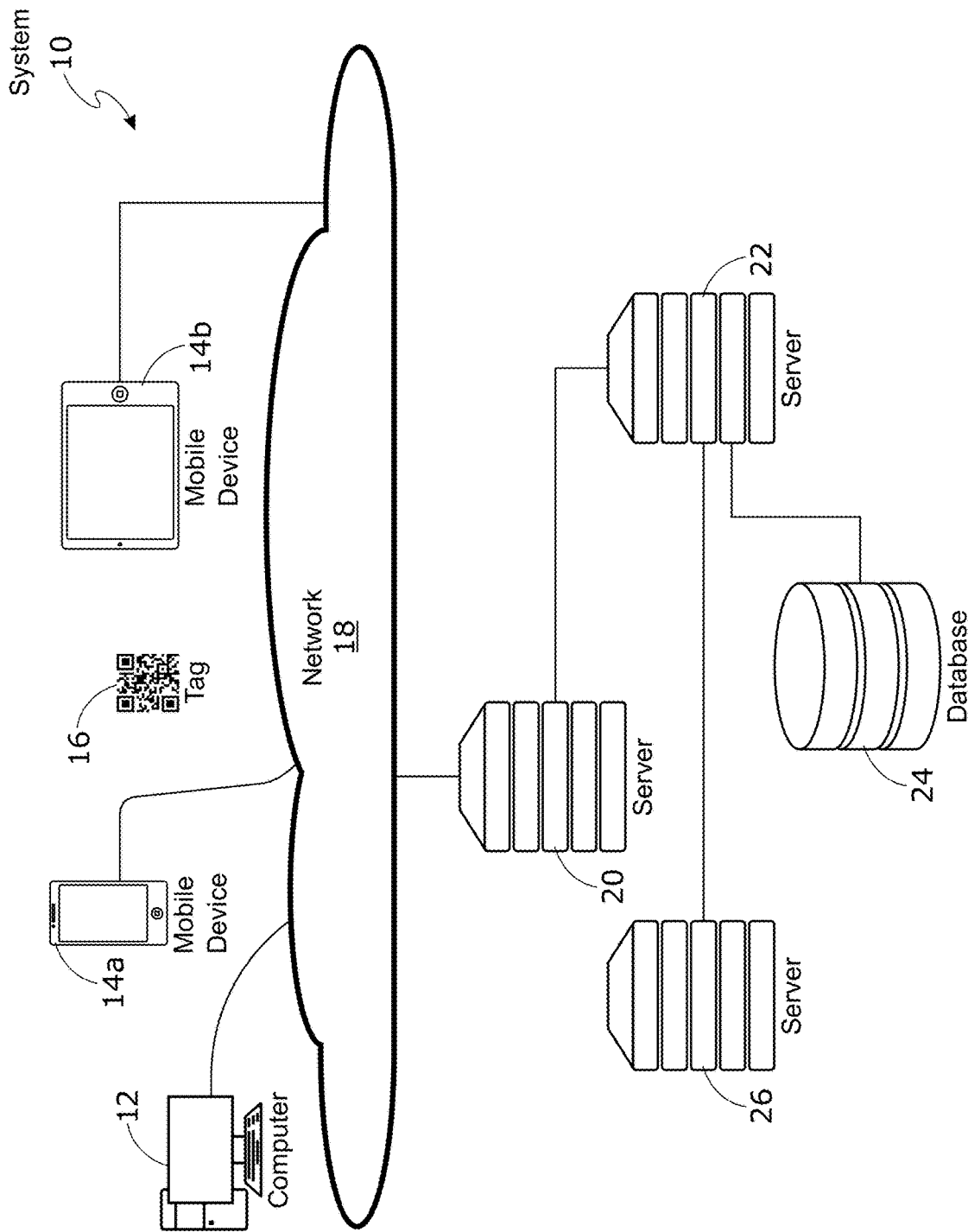
FIG. 1 details an embodiment of the notification and reporting system.

Members of the general public typically do not have access to information in which they have an interest, such as sanitation reports, monitoring reports, and other types of potentially recorded activities. If members of the general public do have access to this type of information, it is typically handwritten on a sheet of paper located somewhere in the area of interest such as a public restroom. Paper cleaning logs usually lack details about when specific objects or areas were last cleaned and can be of questionable accuracy. Furthermore, employees or workers who are doing the cleaning, monitoring, or the like are also burdened by current systems. For example, the worker/employee may either handwrite the information on a paper log, submit a report to someone else who then enters the information into a tracking system, enter the information into a tracking system themselves, and redundant combinations of the forgoing. As a result, information, if tracked, may be documented in hindsight, if at all. Thus, a person who is a member of the general public either does not know when an object or area has been last cleaned, monitored, etc., or he/she has to search for a piece of paper that may or may not have accurate information. Similarly, workers/employees may spend a good amount of time documenting their activities, which may negatively affect performance of their primary job.

Members of the general public may also find it difficult to get help without leaving the area of interest such as a public bathroom. For example, if a stall does not have toilet paper, a soap dispenser is empty, or a drink is spilled on the floor, a member of the general public may either try and remedy the situation him or herself or leave the restroom to find an employee to assist. Alternatively, a member of the public may leave the situation as is until another person tries to take care of it, or a worker returns for routine servicing. Employees/workers enlisted to help may have to leave what they are doing to find the right equipment, supplies, or other employee, which may detract from workplace performance or efficiency. Alternatively, the responsible employee/worker may find out about the situation much later, when the situation is worse and will take more time and effort to remedy than if it was attended to in a timely manner. This is because workers/employees simply may not know about the problems until much later.

Embodiments of the present invention described herein alleviate concerns raised in the forgoing paragraphs by providing systems and methods for delivering real-time digital verification records such as sanitization records, monitoring records, and the like, to a mobile device (e.g., without limitation, a smartphone) being used by public user (i.e., end user who is not a worker/employee), an employee (i.e., end user who is a worker/employee) or both (i.e., mobile device users) in an easy, convenient, and accurate manner. The public user may employ embodiments of the present invention to provide feedback, report problems or issues, make requests, etc., that relate to an object/area of interest right from his/her mobile device without leaving the immediate location. Furthermore, an employee may use his/her mobile device to update digital records in real time, as objects, locations, or both are being cleaned, monitored, or otherwise tracked. Thus, embodiments of the present invention may be utilized to ensure that both public users and employees receive real-time information about or relating to a point of interest, can react to that information (without leaving the area), and if a reaction was submitted, receive an update thereto. The following paragraphs provide details about various nonlimiting embodiments of the present invention.

Entities such as hotels, airports/airlines, educational and workplace campuses, cruise ships, trains, rideshare vehicles, businesses, restaurants, sports complexes and performance stadiums, and hospitals (without limitation) may utilize embodiments of the present invention by identifying objects and/or areas of interest (i.e., points of interest). Generally, points of interest include objects (e.g., equipment, machinery, furniture, vehicles, appliances, etc.) and/or locations (e.g., rooms, waiting areas, lounges, recreation areas, spas, and other areas/locations within or around buildings), but may also include real-time issues (e.g., a medical emergency, incidents, a safety issue, desires or requests like ordering something, etc.) in which the entity has an interest in tracking data, the entity perceives public users have an interest in receiving data, or both. For example, a restaurant may want to track sanitization efforts; thus, the restaurant could identify areas such as waiting areas, restrooms, kitchens, dining areas, outdoor areas, etc., and/or objects within or near the areas such as tables, counters, chairs, benches, sinks, and the like as points of interest. As another example, a campus may want to track security, wellness, maintenance, sanitization, or other efforts (or combinations thereof); thus, the campus could identify areas such as buildings, floors, rooms, outdoor spaces, recreation areas, parking lots/garages, stadiums, and other on-campus areas as areas of interest. On a campus, objects of interest may correspond to the type of tracking effort. For example, maintenance tracking may include objects such as equipment, including sensitive equipment found in laboratories, appliances, and parts of buildings (e.g., plumbing, electrical, fixtures).

A campus may be interested in tracking the wellness of its students, faculty, and/or staff members. A person's wellness record may be associated with a room to which they are assigned such as a dorm room or an office. Thus, in some embodiments points of interest may include a person who is associated with a particular object or area. As yet another example, a health care provider may want to track patient information such as times and dates that vitals are checked; thus, the health care provider may identify areas such as patient rooms, and/or objects such as individual beds within a room, as areas/objects of interest. As with the campus example, the point of interest in the hospital setting may really be the person associated with the room, bed, or both. Thus, the types of entities that may utilize embodiments of the present invention are wide and varied, as are what an entity considers to be one or more points of interest.

An entity uses a network of tags to identify points of interest to public users and employees. The number of tags in the network and placement of tags on, in, or near points of interest is at the discretion of an entity to fit its particular assets and needs. Further, an entity may add to or subtract from the number of tags in the network at will. Each tag in the network of tags has a unique identifier (tag ID), which may be used to identify a database record for the particular point of interest. As one nonlimiting example, a hotel having an interest in tracking sanitization efforts may situate a tag inside each guest room. The tags may be placed to be easily reached by both guests and employees such as in, on, or near one or more of a wall, a door, a door frame, or a piece of furniture. Since each room has a tag with a unique tag ID, each guest may use the tag to access cleaning (or other) information for his or her room such as the date and time housekeeping last cleaned the room. Similarly, housekeeping personnel may update cleaning information for each room using the tag.

Referring to FIG. 1, a public user, an employee, or both may use system (10) to access information pertaining to a point of interest. Generally, the public user/employee may use mobile device (14a or 14b) to scan tag (16). Scanning use the tag (16) causes the mobile device (14a or 14b) to initiate communications with server (20). Communications between mobile device (14a or 14b) and server (20) may be via one or more networks (18). In response to receiving a request from mobile device (14a or 14b), server (20) may communicate with server (22) to begin fulfilling device (14a or 14b) request. For example, server (20) may call to server (22) to find out where to direct the browser to fulfill the request. Server (20) may redirect the browser to the appropriate location. After redirection, server (22) may obtain the desired information from database (24). In turn, server (20) may then send a response with the desired information to the requesting mobile device (14). System (10) may also include a further server (26), which may collect and analyze information about, or pertaining to, mobile devices (14a or 14b) that have scanned a tag. Server (26) may also obtain information from other sources. Data collected by, and analysis may by server (26) may be used by server (22) and/or stored in database (24). Database (24) stores all data for system (10), including tracking data. An administrator may access system (10) via computer (12) for management and other purposes. This computer (12) can be a laptop, tablet, phone, or a desktop computer, or other device, so long as it can perform the necessary computing processes.

Although the architecture shown in FIG. 1 is reminiscent of a three-tier client/server system where processing is divided between at least two servers, embodiments are not so limited. The numbers and types of servers and software may be scaled up, down, and distributed according to system (10) demands/needs. Furthermore, more than one virtual machine may run on a single computer and a computer/virtual machine may run more than one type of server software (e.g., the software that performs a service, e.g., Web service, application service, and the like). Thus, in some instances system (10) may include one computer for all processing demands, and in other instances system (10) may include several, hundreds, or even more computers to meet processing demands. Additionally, hardware, software, and firmware may be included in system (10) to increase functionality, storage, and the like as needed/desired.

Computer (12), which is shown in FIG. 1, may be any type of computer such as a laptop computer, desktop computer, tablet, and the like. Similarly, mobile device (14a or 14b) may be any type of mobile processing device such as a handheld computer (e.g., phone, smartphone, tablet, personal digital assistant), wearable computer (e.g., watch, glasses), or portable computers (e.g., laptop, netbooks). Scanning of the tag (16) from the mobile device (14a or 14b) is performed through near-field communication (NFC) or use of a camera on the mobile device (14a or 14b) to scan the visible quick response code (QR code). Computer (12) and mobile devices (14a or 14b) typically include a browser application to facilitate communications with one or more servers among other things.

Computer (12), mobile devices (14a, 14b), and servers (20, 22, and 26) may each be a general purpose computer. Thus, each computer includes the appropriate hardware, firmware, and software to enable the computer to function as intended. For example, a general purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as Random Access Memory (RAM), Dynamic Random Access memory (DRAM), or Static RAM (SRAM), without limitation. The processor together with the memory may implement system and application software including instructions disclosed herein. Examples of suitable storage includes magnetic disk drives, optical disk drives, tape drives, an internal storage device, an attached storage device, flash memory, hard drives, and/or solid-state drives (SSD), although embodiments are not so limited.

In an embodiment, servers (22 and/or 24) may include database server functionality to manage database (24) or another database. Although not shown, architecture variations may allow for database (24) to have a dedicated database server machine. Database (24) may be any suitable database such as hierarchical, network, relational, object-oriented, multimodal, nonrelational, self-driving, intelligent, and/or cloud based to name a few examples. Although a single database (24) is shown in FIG. 1, in embodiments database (24) may comprise more than one database, the more than one databases may be distributed across many locations, and data may be redundantly recorded in the more than one database. Furthermore, data may be stored in blocks that are part of a chronological blockchain and may be dispersed across a decentralized distributed ledger. Blocks of data in a blockchain are linked in such a way that tampering with one block breaks the chain. Thus, digital data stored in a blockchain is verifiable with a high level of integrity.

Figure 2:
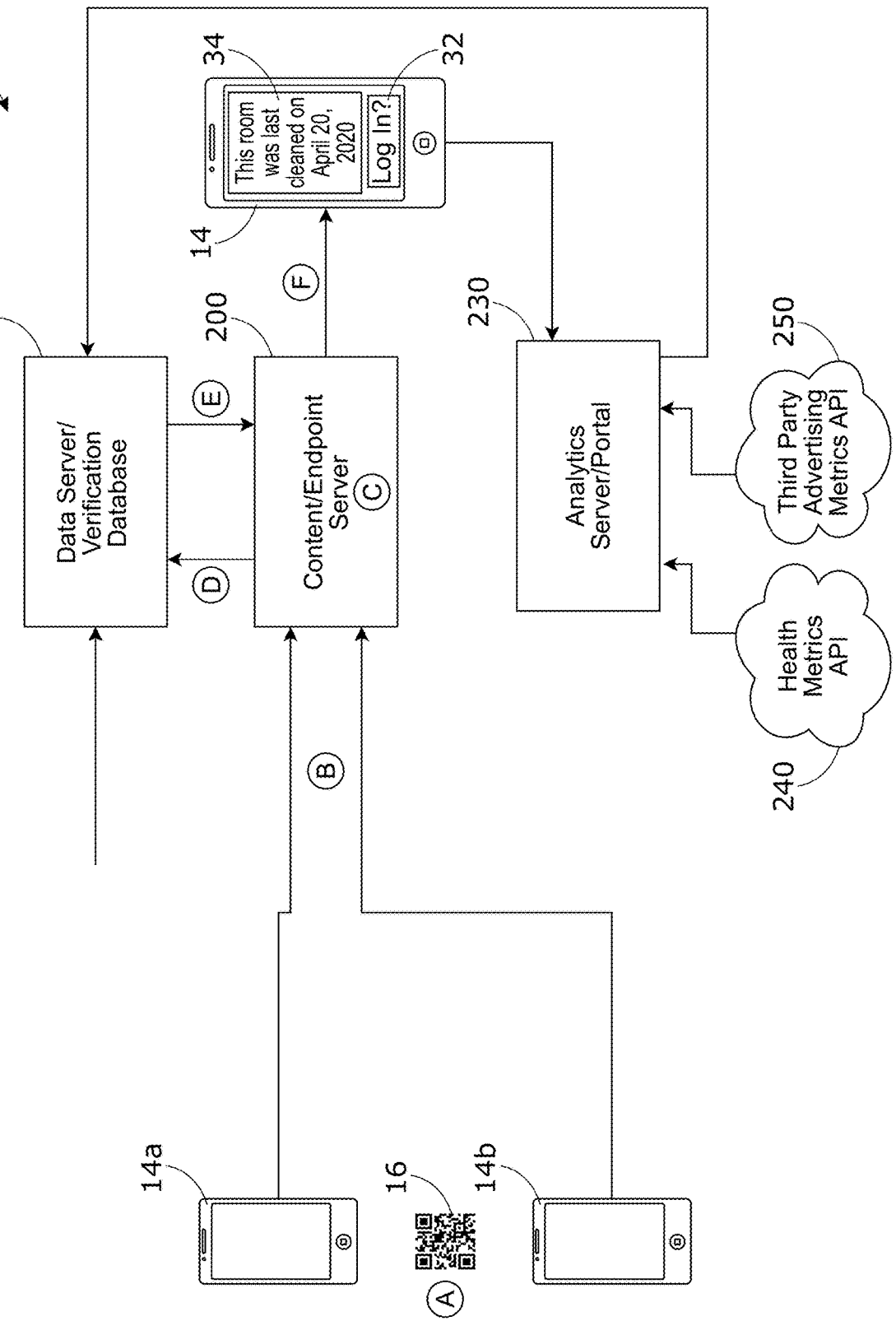
FIG. 2 details a flow diagram of the system and methods of notifying and reporting issues in a location.
Figure 3:
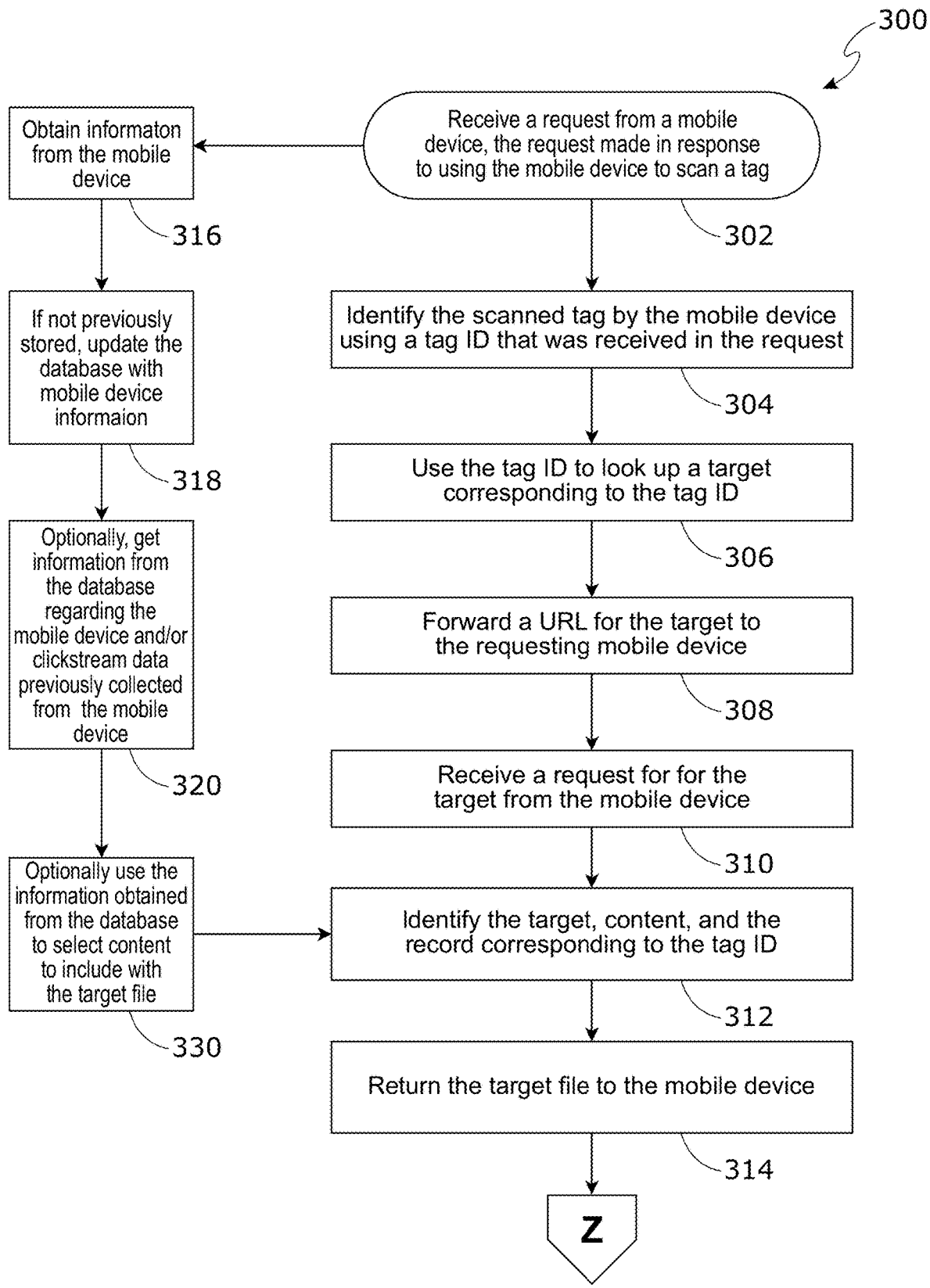
FIG. 3 details a block diagram of the system and methods of notifying and reporting an issue in a location.

FIG. 2 pictorially depicts embodiments of system (100) for providing a real-time record (relating to a point of interest) to mobile devices (14a, 14b). The record is provided in response to using mobile devices (14a, 14b) to scan a tag (16) that is on, in, or near a point of interest. FIG. 3 is a flow chart that schematically illustrates embodiments of a method (300) for providing the real-time record to mobile devices (14a, 14b). To help explain system (100) and method (300), consider a nonlimiting scenario wherein a hotel is the entity (e.g., company, business, institute, etc., that has an interest in tracking information) using a network of tags (16) to track cleaning services relating to guest rooms.

According to the above mentioned scenario, the hotel has placed a tag (16) in each guest room on, in, or near the entrance to the room (either inside or outside of the door). The hotel has also placed at least two tags within each room, one in the bathroom, and the other on, in, or near an object such as a telephone, refrigerator, microwave, remote control, lamp, headboard, and the like, inside the room. Additionally, or alternatively, the hotel may display a tag (16) on a device having a display screen (e.g., telephone, a television, appliance, and the like). Thus, each guest room in the hotel has one to four tags (16) associated therewith. Hotel guests (i.e., public user) and housecleaning staff (i.e., employees) may both use embodiments of system (100) and/or method (300) to obtain the latest cleaning records relating to guest rooms and/or points of interest therein. Hotel employees, however, may also update cleaning records using mobile devices (14a), which is discussed with respect to FIG. 4.

Referring to FIG. 2, at "A," both the employee and the guest uses his/her respective mobile device (14a, 14b) to scan tag (16), which in this example is located on, in, or near the entrance to the room assigned to the guest. Notably, both mobile device users (e.g., collective term for public users and employees) use their respective mobile device (14a, 14b) to scan the same tag (16) and obtain the same cleaning record information for the assigned room. Using one tag for both employee and guest access to the same information decreases the number of tags needed to identify a particular point of interest, which may also reduce confusion as to who (e.g., employee or guest) should scan what tag in a system using two tags to identify the same point of interest. Usually, however, guests and employees do not scan the same tag (16) at the same time. It is more likely that an employee will scan a particular tag (16) with his/her mobile device (14a) before and/or after a guest. Generally, the time between tag (16) scans (by any mobile device [14a and/or 14b]) depends upon the frequency of tag (16) use; hence, it can be less than a minute to hours or even days between the time an employee scans a particular tag (16) and the time a public user scans the same tag (16) with their respective mobile devices (14a, 14b).

Tags (16), in embodiments, include encoded information that may cause each mobile device (14a, 14b) to independently send a request for a record to a remote server such as server (20). Each tag (16) in the network of tags (16) may include machine-readable code, instructions encoded on a chip, or both. Machine-readable code, for example, may include quick readable (QR) code, universal product code (UPC), and/or other types of machine-readable graphics (e.g., having a pattern, matrix, or the like) coding. Alternatively, technologies that use data stored on a chip include, without limitation, near-field communication (NFC) technology and radio-frequency identification (RFID) technology. Thus, each tag (16) in an entities network of tags (16) may include one or more of a machine-readable graphics code, NFC encoding, or RFID encoding, although embodiments are not so limited.

Information encoded on or in a tag (16) may include a uniform resource locator (URL), according to an embodiment. URLs may provide an address to a resource on the network (18). In this way, a browser application knows where to send an initial request for a resource a record. According to embodiments of the invention, each tag (16) may include a base URL to direct Web browsers (including mobile Web browsers) to a server such as content/endpoint server (200), which is tantamount to server (20) (FIG. 1) in an embodiment. Moreover, each tag (16) in the plurality of tags (16) may have a unique a tag identifier (e.g., tag ID) as part of the encoded information to communicate to the content/endpoint server (200) which specific tag was scanned by mobile devices (14a, 14b).

Thus, when mobile devices (14a, 14b) scan tags (16), the tag URL (e.g., including the base URL and tag ID) may be conveyed to the mobile devices (14a, 14b). For example, most mobile devices (14a, 14b) include a camera already enabled to scan/read machine-readable codes. If a camera is not already enabled to function as a scanner/reader, scanner/reader applications are typically available for download to mobile device (14a, 14b). Likewise, many mobile devices (14a, 14b) come NFC/RFID-enabled. NFC/RFID technology uses wireless (very short range) technology to transfer data. Thus, moving a mobile device (14a, 14b) close enough to a tag (16) will enable the mobile device (14a, 14b) to receive data.

Tags (16) may have a physical (e.g., tangible) form, a digital (e.g., virtual/intangible) form, or may be combinations of both forms. Physical versions of tags (16) may be constructed from diverse types of materials. In the case of machine-readable tags, the code may be printed, etched, or fabricated on materials such as paper, glass, plastic, metal, fabric, and the like as a few nonlimiting examples. In the case of NFC/RFID-enabled tags (16), the tags (16) may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. Digital portions of tags (16) may be displayed on a screen or communicated via radio waves. In the case of machine-readable tags, the graphical code may be displayed on a display screen associated with the point of interest.

Armed with the tag URL obtained from the scanned tag (16) (e.g., tag [16] that has just been scanned by mobile device [14a and/or 14b]), the Web browser on mobile device (14a and/or 14b) sends a request to content/endpoint server (200), as is shown at "B" in FIG. 2. The browser request may be sent to content/endpoint server (200) over the one or more networks (18). Since content/endpoint server (200) recognizes browser requests directed toward it, content/endpoint server (200) receives the request, which is pictorially shown in FIG. 2 at "C" and starts method (300) at step (302). As the tag ID for a particular tag (such as the tag [16] on, in, or near the entrance to the guest room) references a database (e.g., FIG. 1, database [24]/FIG. 2, verification database) entry, content/endpoint server (200) begins processing the browser request. See FIG. 3 at step (304). For instance, content/endpoint server (200) may send a call to data server/verification database (220). In embodiments, the call may include the tag URL or information extracted therefrom.

Data server/verification database (220) receives the call from content/endpoint server (200) and continues with processing the browser request, which is shown at "D" in FIG. 2. Processing may include one or more queries/requests to one or more databases such as verification database(s). The tag ID, in embodiments, may be referenced in a request to the database, which is shown in FIG. 3, step (306). Simply stated, the query may reference a unique tag ID (e.g., from tag by the room entrance) in a request for specific information linked or related to the tag ID. In response to the current database request, the query returns an identifier to a particular target (target ID) and the tag ID from the request. The target ID and tag ID may be attached to a base URL for the target thereby completing a target URL. Target URLs may redirect the mobile device (14a and/or 14b) browser to a location to obtain the desired content. Generally, redirection points a browser to content that the entity owning the tag (16) (e.g., the hotel in the scenario) wants the mobile device users to see. When a tag (16) is created, it may not yet be owned by particular entity. Redirection enables any entity to purchase the tag (16); linking the tag ID to a particular target ensures that a requesting browser will end up in the right place for the entity that now owns the tag. Similarly, the entity owning a plurality of tags (16) may want to redirect a browser somewhere else in response to a tag (16) scan. For example, instead of obtaining cleaning information, a hotel may want to redirect mobile devices to content relating to a special event or circumstance. This may be accomplished by changing the target ID associated with the tag ID to an identifier (target ID) for the new target.

As is pictured in FIG. 2 at "E," the data server/verification database (220) responds to the call sent by content/endpoint server (200) so that content/endpoint server (200) can reply to the browser request. See, also, FIG. 3 at step (308). In embodiments, content/endpoint server (200) responds to the request initiated via the tag URL with the completed target URL, which includes both the target ID and the tag ID. In this way, the browser on the mobile device (14a, 14b) that scanned the tag (16) will be redirected, via the received target URL, to the proper location.

Before the browser running on scanning mobile device (14a, 14b) can display record data, the browser sends another request to content/endpoint server (200), this request via the completed target URL. Like the request via a tag URL, the content/endpoint server (200) receives the target request, which is shown at step (310) of FIG. 3. In processing the request for the identified target, the data server/data verification database (220) may use the tag ID in a query for data related to the tag ID. The server (220) may also use the target ID to obtain target instructions corresponding to the target ID, which may in embodiments include instructions for obtaining content to be displayed together with the requested record such as ads, third-party content, health metrics content, coupons, promotions, and the like. See, e.g., FIG. 3 at (312).

In embodiments where the target URL is considered a dynamic request for an HTML document, the data server/verification database (220) may use instructions obtained by the target ID to dynamically create a hypertext markup language (e.g., HTML) page. This type of HTML document may be based on an HTML template where data from the database is inserted into the document according to the template, although embodiments are not so limited. For example, content/endpoint server (200) may reply to the browser's target URL request with an application such as a such as a Web-based application, cloud-based application, progressive Web application or the like "wrapped" or contained in a Web page. As yet another alternative, the content/endpoint server (200) may reply with a native application/native mobile application for download onto mobile device (14a, 14b). Thus, the target ID may identify target application code to be wrapped in the Web page, or it may identify native application code in the language of the operating system of the mobile device (14a, 14b). Ultimately, content endpoint server (200) replies to the browser's target URL request with the appropriate file, as is shown in step (314).

Referring to the left branch of FIG. 3, information from the mobile device (14a, 14b) that scanned the tag may be obtained. This information may be gleaned from a browser request and/or other sources of information. See, e.g., step (316). Cookie information, for example, may be included in a browser request. Cookies, in an embodiment, may help maintain the state of a session, keep track of preferences, keep track of other information, and combinations thereof. At step (318), data server/verification database (220) may store information about or related to the mobile device (14a, 14b).

In an embodiment, information about a mobile device (14a, 14b) and/or information linked thereto may already be stored in the database; that is, before the current scanning activity. Thus, this information from prior activity may be obtained for use in personalizing content as one nonlimiting example. See FIG. 3 at steps (320) and (330). In this way, personalized content (and/or links thereto) may be included in the file to be delivered to mobile device (14a, 14b). See FIG. 3 at (314).

Figure 4:
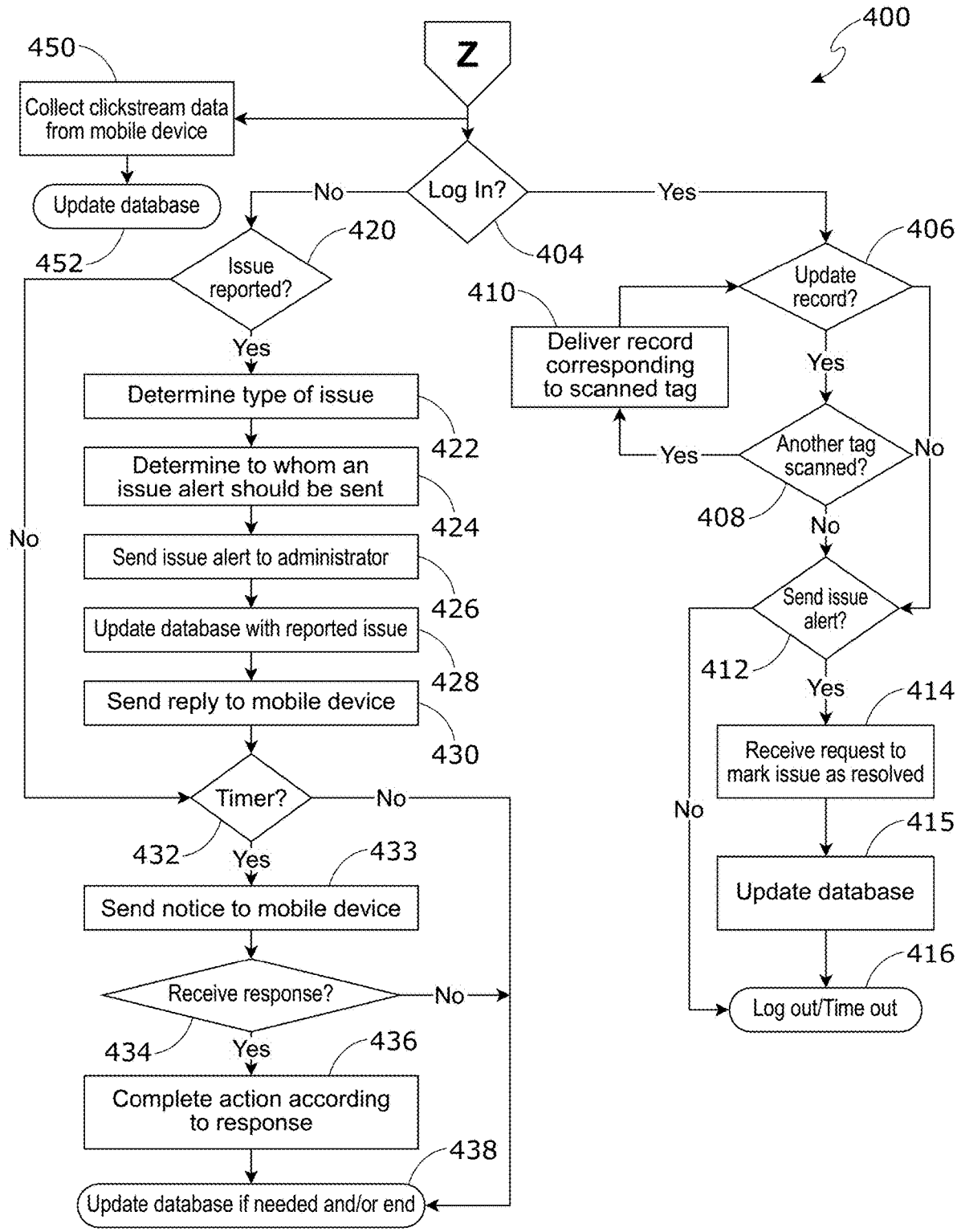
FIG. 4 details a continuation of the block diagram of FIG. 3.

Once received, mobile device (14a, 14b) browser starts processing the file for display on a display screen. The browser may use code, scripts, server pages, style sheets, tags, and the like delivered with and/or embedded in the HTML file to display content and to facilitate interactions between mobile device (14a, 14b) and data server/verification database (220) (by way of content/endpoint server [200]). See FIG. 2 at "F." Displayed content may include, without limitation, the most up-to-date tracking information (e.g., date of cleaning), and a "log in" icon (32), as is shown in FIG. 2. Both the employee and the guest may view the same HTML document. In an embodiment, method (300) may continue at "Z" to method (400), which is shown in FIG. 4. It is conceivable, however, that no further action is taken by the employee or the guest and method (300) stops after rendering the HTML document that was received by mobile device (14a, 14b).

Thus, per the original hotel scenario, and in particular example using the architecture of FIGS. 2 and 3, is that the hotel has placed a tag (16) on, in, or near a bathroom. An employee using their mobile device (14a) scans the tag (16) and receives the date in which the bathroom was last cleaned. Similarly, a guest can, at a time before or after the employee has scanned the same tag (16), also perform a scan of the tag (16) to check when the bathroom was last cleaned. Use of a single tag (16) allows for a reduction of visual tags (e.g., if one was for the guest and a second one for management) and allows for simply and efficient record keeping of the facilities.

This same architecture can be applied to an employee updating a record after subsequently cleaning the bathroom, or for reporting an issue or incident. Assume that the toilet in the hotel room of the example has malfunctioned. Typically, someone would have to get the phone, make a call, wait on hold, get to service or housekeeping, and then address the issue. In some instances, people do not want to report an issue as they are embarrassed at the cause of the issue, and thus some of the issues remain unreported. The use of the tag (16) and a mobile device (14a, 14b) allows for contactless communication and reporting of the issue. The user can scan a tag (16), use an icon in a graphical user interface (GUI) (34) or other form within the URL to identify the issue and a report is generated to the owner of the business. The user can further upload an image or provide additional context to further explain the perceived issue. Such information can be added via the GUI or form within the GUI. Then an employee can resolve the issue, and once resolved, scan the tag (16) to mark the issue as resolved. In an embodiment, additional information may be added that is desired to close the issue that was reported. This information would then live in the database (220) so that the resolved issue could be identified, as necessary. The particular issues can be genericized for the public user so as to not disclose personal information but may remain available to the business owner.

FIG. 4 shows a flowchart that schematically illustrates embodiments of method (400) for enabling interactions between mobile devices (14a, 14b) and data server/verification database (220), (see, e.g., system [10 and/or 100] of FIG. 1 and FIG. 2, respectively). With respect to an employee, the method (400) enables the employee to use his/her mobile device (14a) to update one or more database records. With respect to the public user, method (400) enables the public user to use his/her mobile device (14b) to send a report about an issue and/or other interactions, as is described in conjunction with the method (400). The method (400) also enables monitoring of reported issues.

Referring to FIG. 4, at step (404) an employee may log into an employee-facing side of method (400), such as by selecting the "log in" button on the display of mobile device (14a, 14b) (see, e.g., FIG. 2 at "F"), although embodiments are not so limited. If, at step (404), an employee does not log in, method (400) continues with a public user facing side of method (400). Thus, if an employee does not log in, additional actions taken by the employee will result in being processed as if the employee is acting as a public user. This is perfectly acceptable if it is the employee's intent.

After logging in, an employee may or may not choose to update record data currently displayed on his/her mobile device (14a). For instance, referring the display screen (36) of mobile device (14a) in FIG. 5, a page is shown that provides record data (e.g., the date that a room was last cleaned) and instructions to prompt data server/verification database (220) to update the record (e.g., with the current date) by selecting the "submit" button (38), which is shown at step (406) of FIG. 4. In response to selecting a submit button or the like, data server/verification database (220) updates the record linked to the tag ID of the tag (16) that was last scanned by employee mobile device (14a). If the employee does not elect to update the record, the employee's mobile device (14a) may wait to be sent an issue alert, which is shown at step (412).

If the employee has updated the record (via his/her mobile device [14a]), the employee may use his/her mobile device (14a) to scan another tag (16) (step [408]) and receive (e.g., from content/endpoint server [200]) a record linked to the tag ID for the newly scanned tag (16). That is, the content/endpoint server (200) and data server/verification database (220) may coordinate to deliver a different page (step [410]) to the employee's mobile device (14a). Since the employee is already logged in, however, the delivered page includes record data linked to the tag ID from the last scanned tag (16) (e.g., at step [408]) with the ability to update the record data (step [406]) for the tag most recently scanned. This loop may continue until the employee stops scanning tags (16) with his or her mobile device (14a).

It should be noted that in some embodiments record data corresponding to more than one tag ID may be updated with a single scanned tag. Using the hotel scenario as an example, the tag (16) positioned on, in, or near the guest room door may be a master tag for the other tags in that guest room, which server as servant tags. (See, e.g., FIGS. 6 and 7, detailing master tags). The servant tags (16) in the room are linked in such a way, that when the employee updates the record corresponding to the master tag's tag ID, all of the records corresponding to the linked tags (16) update as well.

Referring to step (420), a public user may use his or her mobile device (14b) to report an issue. Issues may be defined by the entity owning the network of tags. Issues that may occur at the hotel for example, may include inadequate daily cleaning, a malfunctioning appliance (e.g., refrigerator, hair dryer, television), a maintenance issue (e.g., a clogged sink), a missing item (e.g., no soap, toilet paper), a needed item (e.g., extra pillows, blankets, a toothbrush), as a few non-limiting examples. Thus, the hotel may include selectable icons on a Web page or the like to enable reporting issues such as issues relating to the aforementioned examples. The selectable icons may be included on the rendered Web page that was delivered to mobile devices (14a, 14b) (see, e.g., FIG. 3 at step [314]), or they may be rendered on a Web page delivered to guest mobile device (14b) in response to selecting a "report" button like the "log in" button shown in FIG. 2. As yet another option, a displayed Web page may include one or more fillable fields for reporting an incident, adding additional information about a selected incident, uploading a photograph, and the like. When data server/verification database (220) detects that an issue has been reported (step [420]), it may determine what type of issues was reported, for example based on a selected icon or information in a fillable field. See step (422). Thereafter data server/verification database (220) may determine, based on the type of reported issue, an employee assignment, or the like, where it should send an issue alert. See step (424). For example, if the reported issue relates to housekeeping, data server/verification database (220) may send an issue alert to a housekeeping employee, but if the reported issue relates to a maintenance issue, the data server/verification database (220) may send an issue alert to a different employee. If the reported incident relates to an emergency situation such as in a campus or hospital setting, data server/verification database (220) may determine that emergency services should be notified (if so enabled), an employee specifically designated to manage emergency situations (e.g., security, nurse, etc.) should be notified, an administrator for the entity should be notified, or combinations thereof.

Referring to step (412) of the employee-facing side of method (400), an issue alert may be sent to an employee who is already logged in, or simply the alert can be sent by an administrator to a particular employee, who can receive the alert, but does not have to be logged in. The issue alert may be sent to the employee's mobile device (14a) such as via a push notification, short messaging service (SMS), multimedia messaging service (MMS), email, phone call, and combinations thereof. If an employee has received an issue alert and has resolved the issue (e.g., fixed the toilet) the employee may use his or her mobile device (14a) to mark the issue as resolved. See step (414). The issue may also be marked as resolved by the administrator by a remote computing device. If the employee receiving the issue alert does not mark the issue as resolved, the status of the issue may continue to be monitored. For example, the employee may note that a different person is needed to resolve the issue, and a drop down menu or text box or other annotation field may be provided to detail the issue and engage with the appropriate employee to resolve the issue.

Referring to the left side of FIG. 4, data server/verification database (220) may also send an alert to an administrator for the entity (e.g., if not already alerted). Data server/verification database (220) may update the database every time an incident is reported in connection with a recently scanned tag (16). For example, the data server/verification database (220) may use the tag ID to link the record for the tag (16) with data related to the reported incident. See step (428). As a courtesy, the data server/verification database (220) may prompt content/endpoint server (200) to send a reply to the public user's mobile device (14b). Alternatively, or additionally, an SMS message, MMS message, email message, or the like regarding the reported incident may be sent to the public user's mobile device (14b).

Regardless of whether an issue has been reported (see, e.g., step where no issue has been reported), data server/verification database (220), after a predetermined amount of time has passed (step [432]), may cause a notice to be sent to the public user's mobile device (step [433]). If an issue was reported, the notice may relate to the incident. For example, the notice may seek to find out if the issue has been resolved, and if so, if it has been taken care of to the public user's satisfaction. Or if the reported issue related to needing emergency help, the notice may seek to find out if the needed emergency service has arrived. If the public user did not report an issue, the notice may simply thank the public user or to send the public user additional content (e.g., ads, incentives, questionnaires, etc.).

As yet another alternative, the notice may provide the opportunity for further engagement, such as checking out from the hotel, ordering room service, purchasing merchandise, and the like. If a response has not been received, (step [434]) method (400) may continue to step (438) and update the database if needed before ending. If, however, a response has been received (step [434]), data server/verification database (220) may complete additional actions to be taken (step [436]). For example, if the public user has responded indicating that a reported incident is still unresolved, data server/verification database (220) may send another issue alert to the same employee, or an issue alert to a different employee and/or an entity administrator. In embodiments, data server/verification database (220) may continue to follow up on an unresolved incident until the incident resolved (see, e.g., step [414]) and/or adequately addressed (e.g., emergency service/first responder contacted) and the database is updated to reflect incident resolution. See steps (415) and (438). Alternatively, if the public user responded to further engagement, data server/verification database (220) may take an action in accordance therewith, such as checking out, ordering room service, paying for merchandise and the like. Before ending the public user facing instructions, data server/verification database (220) updates the database (step [438]) with information relating to the scanned tag (16). For example, incident report activity is updated and/or engagement transactions are noted. Similarly, before exiting employee-facing instructions (step [416]), data server/verification database (220) updates the database (step [415]) with data relating to a tag (16) in question (e.g., regular updates, issue alerts and the like).

During execution of both the public user facing instructions and/or employee facing instructions, information may be gathered (step [450]), for example by the analytics portal (240) running on an analytics server (see FIGS. 2 and 5) and saved to a database associated therewith (not shown) or the database maintained by data server/verification database (220). Data collected through analytics portal may include tracking data, clickstream data, data from devices (14a, 14b), data about devices (14a, 14b), browser requests and the like. Collected data may be subject to machine learning to predict the type of content to display to one or more public users, according to an embodiment.

Entity administrators such as managers, administrative professionals, information technology specialists, and the like may view and/or manage the entity's network of tags using an administration software tool (250). See FIG. 5 at "B." In an embodiment, administration software tool (250) is part of a Web-based software platform running on system (10). An administrator may access administration software tool (250) via a portal such as browser-based Web pages, a Web-based application, a progressive Web application, a downloadable application, a native application, and a cloud-based application (to name just a few examples), which may be delivered to computer (12) by content/endpoint server (200). Thus, as is shown at "B" of FIG. 5, the administrator may use administration software tool (250) to view the real-time status of all tags and endpoint/target URLs located within the system (10). Similarly, the administrator may use administration software tool (250) to manage endpoints/targets and content. Furthermore, an administrator may receive a notification that a request or an issue has been reported. The administrator, through the administrative software can then control all of the reported issues and assign employees to resolve the same. For example, at a sports facility, where a number of issues may be reported in a short amount of time, the administrator can identify the issues, send the appropriate personnel to each, and efficiently resolve those issues. The Administrator can communicate to personnel via SMS or radio and provide information to employees who are seeking to resolve each issue. The issue can then be resolved by the employee or by the administrator.

Figure 5:
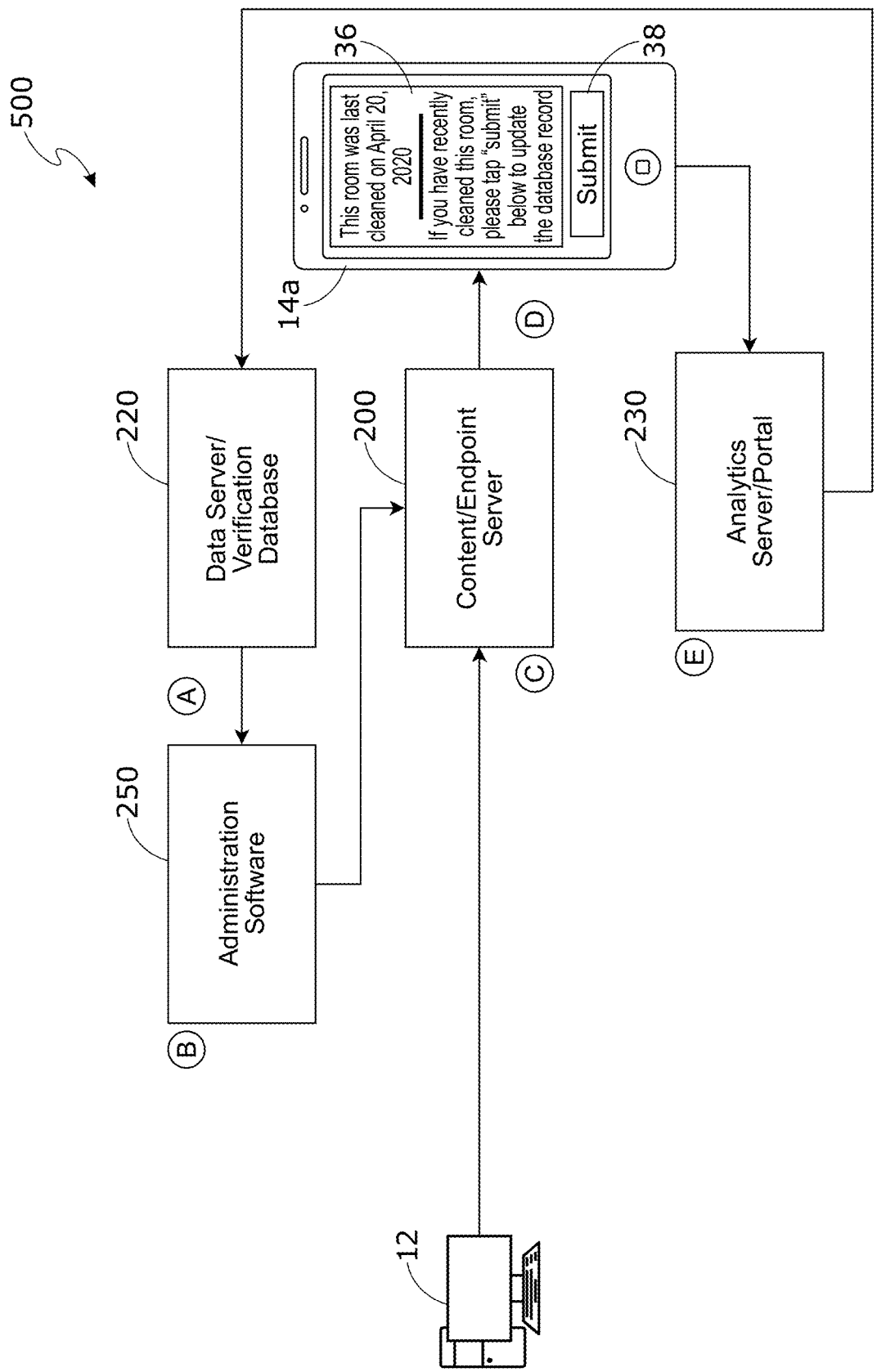
FIG. 5 details a flow diagram regarding cleaning of a room within an embodiment of the presently disclosed system.

Referring to FIG. 5, the system (500) comprises a data server/verification database (220) to manage data stored in a database such as database (24). Sec, e.g., FIG. 1. Data stored in database (24) may relate to tags, public users, employees, content, third party data, and the like. Thus, in embodiments of the invention, administration software tool (250) may send requests (e.g., query, read, write, etc.) to data server/verification database (220). Data server/verification database (220) may, in response to a request, provide real-time verification records to administration software tool (250), which is shown in FIG. 5 at "A." In embodiments, data server/verification database (220) may provide data that has been verified using verification techniques/algorithms. And in an embodiment, data server/verification database (220) may provide data that has been verified as part of a blockchain distributed ledger. In certain embodiments, the administrative software tool (250) may be employed by a person, who can provide feedback to other personnel. In other embodiments, the administrative software (250) is run using AI, wherein the software is able to generate appropriate information, assign tasks, resolve issues, send notifications, etc. Indeed, the software may be able to more easily identify personnel who are not busy, who are located closest to an issue and who have the skills to resolve the issue in the most efficient manner, allowing administrators to solve or address human issues. In some instances, a server or other installed computing device may be necessary for computing power, however, in most, if not all cases, laptops, tablets, and other mobile devices have sufficient capabilities to perform these steps.

In addition to providing a portal to the computer (12), content/endpoint server (200) may deliver content to mobile device (14a, 14b) through browser-based Web pages which may be part of a Web-based application, cloud-based application, progressive Web application, and the like. Alternatively, mobile device (14a, 14b) may receive a native application from the content/endpoint server (200). See FIG. 5 at "D." Analytics portal (230), running on an analytics server may be included in the Web-based software platform. See FIG. 5 at "E." Analytics portal (230) retains user requests and/or data from past user interactions with one or more tags, including interactions assigned to an individual mobile device/user and/or collective interactions of some or all mobile devices/users. The analytics portal may also incorporate third party data from outside sources and platforms such as health metrics APIs, third party advertising metrics APIs, as a few nonlimiting examples (see, e.g., FIG. 2). Furthermore, to complete the cycle, analytics server may run software that uses data points from analytics portal (230) to report information to the data/verification server (220). See FIG. 5 "E" to "A." As nonlimiting examples, analytics server (230) may use information from cookies, log files, page tags (e.g., JavaScript code embedded in Web pages), and combinations thereof for reporting to data server/verification database (220).

Figure 6:
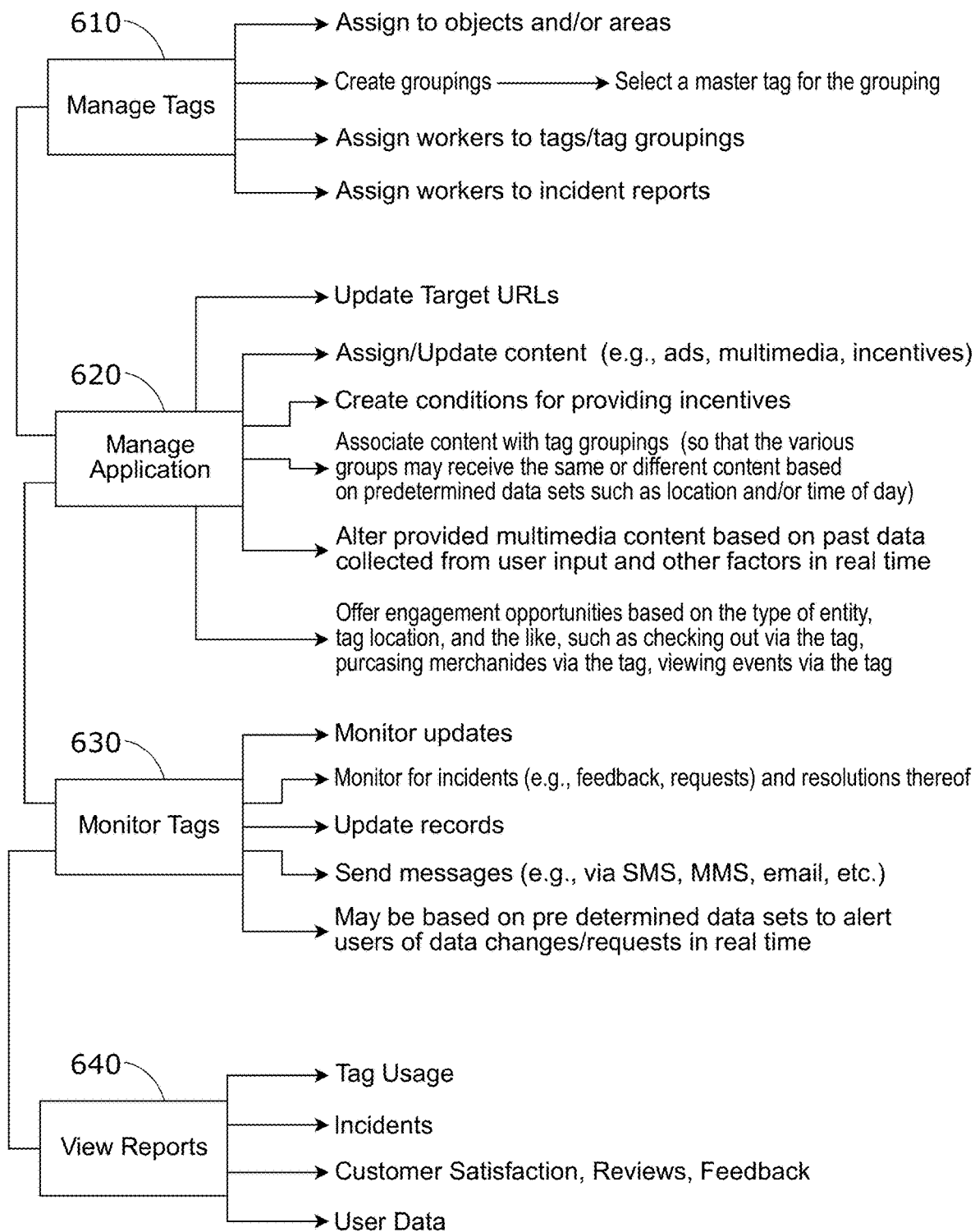
FIG. 6 details a flow diagram of various tags, applications and report and related tasks and information for implementing the system of the present embodiments.

Referring to FIG. 6, four arbitrary categories are listed to represent areas in which an administrator may view/manage data. These categories are designated only for purposes of clarity and are not limitations upon data, and/or how an entity may choose to view, manage, generate, store, or otherwise manipulate data. Oftentimes a task may fall into two of the categories, with part of the task falling in one of the categories and the other part of the task in another category. The four general categories listed in FIG. 6 include tag management (610) application management (620), tag monitoring (630), and reports (640).

Tag management (610) may include administrative tasks such as, without limitation, assigning each tag that an entity possesses to a different point of interest, creating groups of tags, assigning a worker to one or more tags or groups of tags, and assigning a worker to respond to incident reports. It is imperative that each tag is properly assigned to a particular object or area to avoid providing incorrect information. To clarify, each tag includes a unique identifier corresponding to a database record, and each object and/or area of interest is tagged (e.g., has a tag on or in the object/location). Ideally, when a tag on, in, or near a point of interest is scanned, the record for the desired point of interest is delivered to the scanning mobile device (14a, 14b). The administrator may be tasked with ensuring that the tag-object and tag-area assignments in the database correspond to actual tagged points of interest. Toward this end, content delivered to the scanning mobile device (14a, 14b) may also include a description of the point of interest corresponding to the delivered record data.

Strategic tag associations in a restaurant may serve as a nonlimiting illustration. For example, a restaurant may assign a different tag to each section of the restaurant such as the dining area, waiting area, bar, restroom, kitchen, etc., to track cleaning records for the sections as a whole. The restaurant may also assign a different tag to individual objects (e.g., tables, counters, menus, chairs, sinks, toilets, etc.) commonly found within the different sections to track the cleaning record for each object. The database associations (e.g., tag: record) should correspond to reality such that when a tag on Table 10 is scanned, the scanning device receives the most recent sanitization record for Table 10. As another nonlimiting illustration, a campus may assign a different tag to each room in a building such as each room in a dormitory, lecture hall, lab, and the like. When a tag near a given room is scanned, the database associations should match reality so that a mobile device (14a, 14b) receives information corresponding to the tag near that room. Thus, for a mobile device user to receive accurate information regarding a point of interest, database tag/record associations must match actual tag/point of interest associations.

In addition to creating tag associations, an administrator may create groupings of tags using the administration tool (250). The manner in which tags are grouped is flexible to meet the needs of the particular entity at any time. Grouping tags may be advantageous for many reasons. As one nonlimiting example, tags may be grouped to deliver different content to different groups of active users (e.g., mobile device users that have used their mobile device to scan a tag). To illustrate, without limitation, a restaurant may create groups of tags based on their location within a restaurant. If the restaurant is experiencing a heavy rush, the administrator may cause the system to send a coupon for a discounted meal to mobile devices of active customers in the waiting area and a free drink coupon to the mobile devices of active users in the bar area. As another nonlimiting illustration, a campus administrator may group tags in a dormitory by floor, wing, residential assistant assignments, or the like. In this way, each grouping may receive content relevant to just that grouping.

Figure 7:
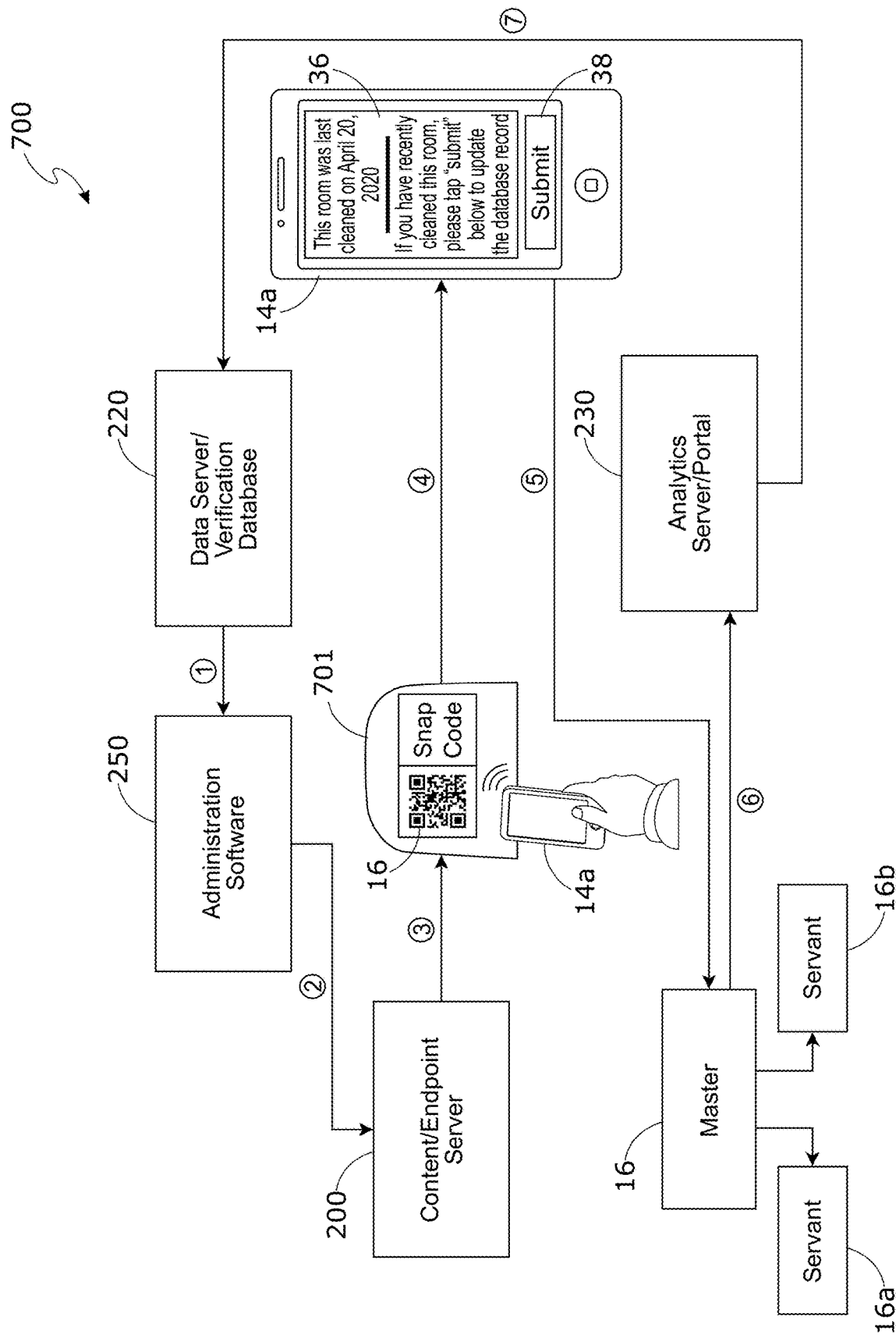
FIG. 7 depicts a flow diagram for use of an embodiment of the system from an admin user, with regard to updating a master and servant tags.

Tag groupings may also be used to update data in multiple records with the same information at substantially the same time. FIG. 7 details this concept wherein the steps remain virtually identical to the other elements as detailed in the system, but adding in a step wherein upon submission, there is a check of whether this tag is a master (16) or a servant (16a or 16b) tag. The system (700), comprises wherein if the tag positioned on a surface (701), is the master tag (16), then the request is whether to update both the master (16) and the servant (16a and 16b) tags, or just the master tag (16). In this way, an employee may need to only scan one tag in the group (e.g., a master tag [16]) to update the records for the master tag and the remaining tags (16a and 16b), etc., in the group. Thus, upon scanning from a device (14a), of the code (16) on a surface (701), the display screen (36) provides an interface for engaging with the system (700), including a submit button. Upon submitting, a determination is made of the master (16) tag or a non-master tag. If a master tag (16), then a decision of updating only the master tag (16), or the master (16) and all servant tags (16a, 16b). Note that there may be one or an unlimited number of servant tags. The analytics server portal (230) then communicates with the data server/verification database (220), and then to the administration software (250), and to the content/endpoint server (200). This follows a path for each subsequent scan of a tag as detailed within the embodiments here.

To illustrate, a hotel administrator may create tag groupings based individual rooms. The master tag (16) may be in, on, or near the door of the room, and the servant tags (16a, 16b), may in, on, or near points of interest within the room. After cleaning a particular room, the housekeeping employee may scan the master tag (16) (with mobile device [14a]) to update cleaning data associated with the master tag and all of the servant tags within that room. With this type of master/servant tag relationship in place, the housekeeping employee does not have to scan each individual tag in the room as the employee cleans. The hotel guest, however, may scan any tag within the room to see cleaning data for the point of interest associated with the scanned tag. The guest may see a record for the point of interest that was updated via the master tag or an update corresponding to just that point of interest, whichever is the latest data entry.

As another nonlimiting illustration, a hospital may group tags by room (master) (16) and one or more beds (servants) (16a, 16b), within the room. A nurse may use the master tag (16) to update the records (e.g., time/date of most recent vitals check) relating to the entire room. The patient/patient visitor may use the tag on, in, or near the bed to access the record for just that bed/person in the bed. Similarly, a master tag may be associated with a larger group of servant tags (16a, 16b), for example a master tag (16) for an entire wing of the hospital, with dozens or more servant tags relating to rooms and/or patients in the wing. A scan of the master tag (16) can be utilized to update all of the servant tags (16a, 16b), with the same information, instead of scanning dozens of tags. This provides a significant efficiency gain for employees, while also increasing consistency of data across all records.

In view of the above illustrations, it may be appreciated that tag management may include many different ways to assign tags to points of interest and ways to group/make secondary assignments (e.g., by employee) and/or other designations relating to the tags within an entity's tag network. Since there is a degree of flexibility, each entity may create assignments, groups, designations, etc., at any time to meet its needs. That is, once configured, the administrator can reconfigure to meet real-time needs.

The administrator may also use the administration tool (250) to manage (620) various features of the platform such as, without limitation, selecting targets for URLs, configuring content parameters such as type, conditions, triggering events, resolving issues, assigning tasks to personnel, sending notifications, communicating with users, communicating with personnel, and the like, and identifying additional engagement opportunities to offer to mobile device users. In embodiments, a target may provide instructions and/or structure for use by a specific entity. Different targets may have different instructions, which may produce different results. Each target may have its own unique identifier (target ID). Thus, in embodiments an administrator may enter a target ID in the database to ensure that a desired result occurs in response to scanning a particular tag. The target ID and a tag ID may be incorporated to a base URL thereby directing a Web browser to the intended endpoint and record for a tag scan, although embodiments are not so limited. In certain embodiments, the administrator may send a notification to personnel that comprises a link to an issue. The personnel may then resolve the issue and either use the link to resolve the issue or report that the issue is resolved to the administrator to mark the issue as resolved.

In addition to the record data, and optionally a description of the point of interest and/or "log in" button, the mobile device user may view other content when a page is rendered on the display of mobile device (14a, 14b). The other content may be in the form of text, video, images, audio, software, scripts, and third-party plugins/addons (e.g., review opportunities, shopping carts, banner ads, popup ads, polling opportunities) to name a few nonlimiting examples. Furthermore, the content may be adapted by subject matter limitations, the occurrence of a condition or event, based on user data (individual or collective), based on the types of incidents that may occur, and engagement opportunities to name a few nonlimiting examples. With respect to subject matter limitations, different entities may wish to provide content that relates to their industry or entity type. For example, a campus may provide only campus-related content, whereas a hotel provide content relating to local attractions, events, restaurants, and the like.

There are many ways to distribute content based on the occurrence of an event or the meeting of a condition. For example, content may be distributed based on a real-time condition, a time of day, a location, and usage, to name just a few examples. Recall the illustration of a restaurant providing a meal discount/free drink during a heavy rush. Wait times may be expected at a popular restaurant, but excessively long wait times may deter people altogether. To compensate for an excessively long wait time, the restaurant may distribute the incentive only after a wait time that exceeds 30 minutes. Similarly, the restaurant may distribute a happy hour coupon only after 5 PM, or only after 5 PM on days with slow traffic. As yet another example, an incentive may be distributed by an entity after a mobile device has been used to scan one or more tags on ten different days. The mobile device user may also receive an SMS or MMS thanking them for scanning tags on x number of separate occasions.

An entity may also have the opportunity to determine what types of feedback it would like from public users and/or what types of engagement opportunities it would to offer public users, if any. User input may be a valuable source of information for a wide variety of purposes such as determining user satisfaction and evaluating employee performance. According to embodiments of the invention, input may be received via a written review, an incident report, or both. Generally, public users may use a fillable field on a Web page or the like to provide a written comment or to describe an incident. Public users may also have selectable reporting options on the same as the fillable field or on a different Web page. Selectable options may be desired by a mobile device user due to their ease of use on mobile device (14a, 14b). Thus, a particular entity may want to include specific, commonly occurring incidents as selectable options and leave a fill-in option for incidents that are not on the list. A hotel, for example, may want to include selectable options such as requests for housekeeping services (e.g., the room was not cleaned to satisfaction), item requests (e.g., something missing in the room that should have been there, something that may not normally be in a room, but the hotel offers either at a cost or for free), maintenance requests (e.g., a broken appliance or fixture), as a few examples. A campus, however, may offer different selections such as after dark escorts (e.g., to campus locations), for maintenance services (e.g., sink stopper does not work), and even for emergency services in the case of an emergency (e.g., injury, accident, overdose).

Similarly, an entity may want to include engagement opportunities on one or more Web pages, push notifications, or the like. In some embodiments there may not be a distinction between engagement opportunities and incident reports, especially from the perspective of the public user. As expected, engagement opportunities may vary widely between industries and entity types. For example, a hotel may enable engagement opportunities such as checking out of the hotel, ordering room service, purchasing merchandise, and the like, whereas a campus may include engagement opportunities such as buying tickets to a game or an event, registering for free events, taking polls, creating study groups, and the like.

Monitoring and reporting (630, 640), via the administration tool (250) may be flexible to enable viewing data in various graphic forms such as graphs, charts, diagrams, and the like. The administrator may monitor the status of points of interest (e.g., via the network of tags) in real time as employees and/or public users cause data in the database change. In this way, the administrator may see employee interaction with tags as the employee is performing routine tasks and incident reports from public user devices as they are reported. During the course of monitoring, an administrator may manually update content based on data collected by the system, data collected by employees, comments made in digital format, comments made via radio or telecommunication, updates provided in a link or filled in within a fillable field, and the like.

To illustrate, as an administrator for a restaurant is monitoring data, he or she may note that the guests at Table 1 have provided a comment (e.g., to the restaurant and/or on social media) that they are impressed with the cleanliness of the restaurant. In contrast, the guests at Table 10 have submitted a request to have their table cleaned for a second time. The administrator may look at the data for Table 10 and see that it was cleaned five minutes ago by a different employee than the one who cleaned Table 1. The administrator may use a short message service (SMS), email, multimedia message service (MMS), phone call, or combinations thereof to remind the employee who cleaned Table 10 reclean the table. Alternatively, the administrator may ask the employee who cleaned Table 1 to clean Table 10 and provide that employee with a reward for doing extra work all via the employee's mobile device. Regardless of which employee actually cleaned Table 10, he or she may scan the tag on Table 10 to update the record or the administrator may do so through the administration portal. The administrator may prefer to update manually to input comments regarding the event. The administrator may also communicate with the guests at Table 10, such as via an SMS, MMS, email, and the like, to ensure that the table has been cleaned to their satisfaction. In embodiments, however, the forgoing may be automated based on prior conditions, data points, or the like provided by the administrator or as configured when the system was initially put in place.

An administrator can run reports on gathered data to view information relating to usage statics, employee performance, incident reporting, and much more. As a few nonlimiting examples, the administrator may run reports on tag usage by public users. These reports may be with respect to the entity's entire network or tags, a group of tags in the network, an individual tag, and the like. In an embodiment, the administrator may even be able to run a limited report on tag usage across several entities. Usage reports may be configured for information such as the number of times a given tag has been scanned by any user during a period of time (e.g., day, week, hour, etc.) or the number of times any tag has been scanned by a particular user during a period of time. Incident reports may be run with respect to a tag, an employee, a group of tags, incident type, and the like. Incident reports may provide information about customer satisfaction, employee performance, and other areas of concern. Incident handling reports may provide information regarding response times, which may translate to customer satisfaction, employee performance, and the like. Report information may be useful to help make business decisions, with employee reviews, to understand customer satisfaction, and the like.

In an educational setting, the systems herein can be especially utilized for incident reporting. Wherein, a tag can be placed within a dorm room, a public setting, a floor of a dormitory, or other accessible location. The tag can be utilized with the GUI or a form opened on a mobile device to report a particular issue, including specifics of an emergency or nonemergency. This allows for reporting of issues, without the personalized aspect of having to call to report an issue that may be embarrassing or where a person may fear facing repercussions for engaging in certain activities. The anonymous aspect and ability to report allows for such reporting with specificity to a location to address the incident.

A further benefit of such system is that the user, whether an employee or a person to the public at large, is able to bring their own device and use a generic device for access to the system. For an employee, the ability to use their own device allows for temporary workers to use a myriad of generic devices to perform their duties. Similarly, it allows a small business to use existing hardware devices instead of investing in new, specialized devices for reporting. At the same time, because cellphones are ubiquitous, the use of nearly any smart cellphone to access and use the system creates a significant advantage, especially when there arises a need to report an incident or other issue.

The system is further designed to allow employees and administrators to scan any tag within the system to log into the system and access the tags assigned to that employee or administrator. In this instance, the employee's mobile device is entered into the system via the employee's mobile IP address or other authentication mechanism. When the employee scans any tag within the system with the employee's mobile device, the system recognizes the employee as an authenticated user and launches a URL or GUI which lists open tasks assigned to that particular employee or administrator. In certain embodiments, by scanning any tag, the employee or administrator receives a list of all issues which remain open. In such a case, an administrator or employee can then assign issues as appropriate to resolve such, if the issues remain unresolve and no other employee is resolving said issues.

Figure 8:
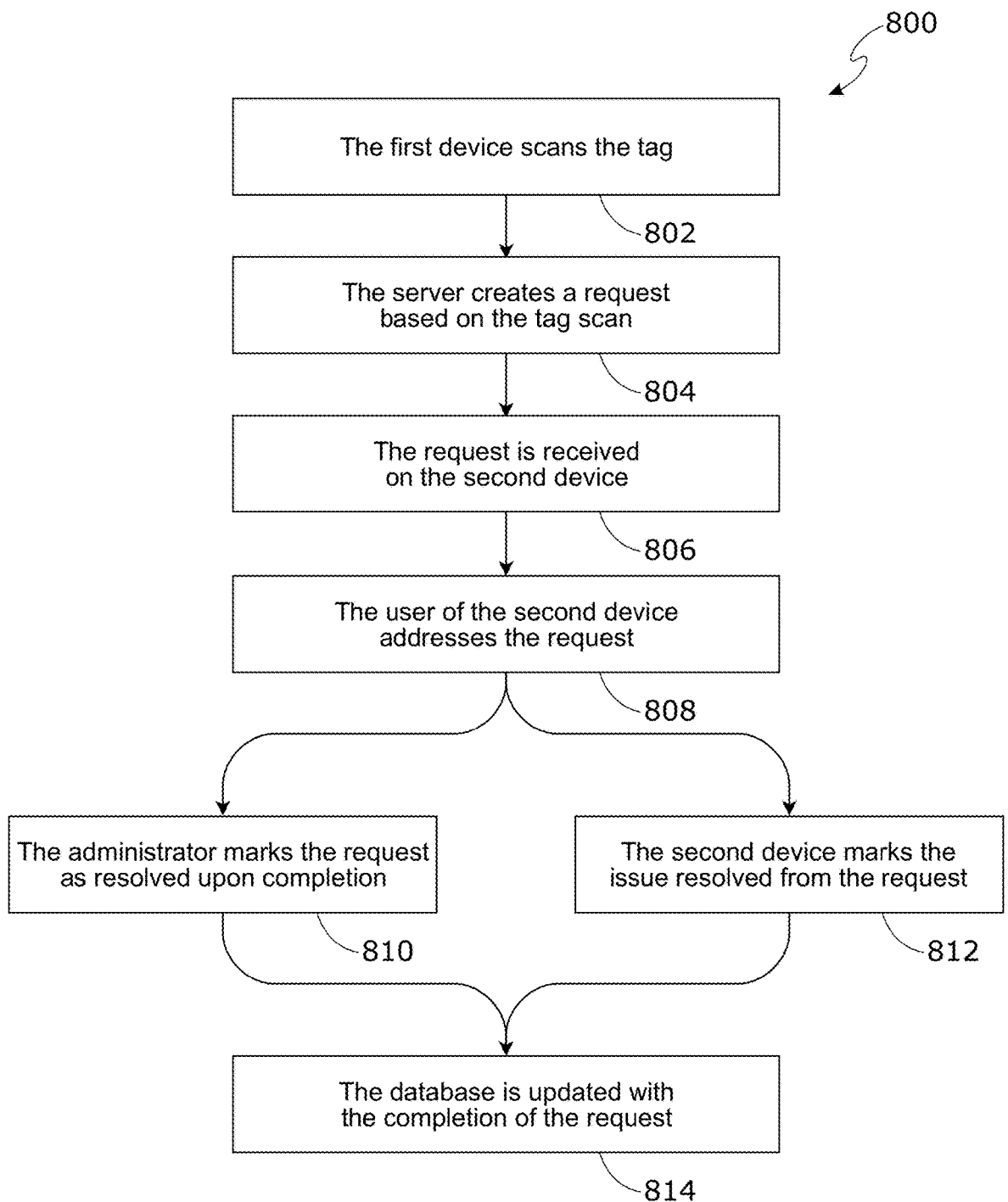
FIG. 8 depicts a flow diagram related to an embodiment of the system for an admin or second user to remotely update tag information.

FIG. 8 provides a simple example of using an administrator or a request to resolve an issue (800). For example, a user in a venue notices an issue in a restroom. The user scans the tag (802) with the user device. The server then creates a request based on the scan of the tag (804). The server then generates the request to a second device and the request is received on the second device (806). Nonlimiting examples of a second device could be a mobile device such as a smartphone, tablet, computer such as a laptop or desktop, or smart watch. Accordingly, after the user has scanned the tag, the request goes into the database and the request is then received on a second device, such as by an administrator device or an employee device, notifying the second device of the request. The user of the second device then addresses the request (808) and then has several options for finalizing the resolution. Nonlimiting examples of resolving the request could entail the administrator assigning the task to an employee via one-way or two-way communication such as a radio, SMS, or MMS notification, push notifications or e-mail. Resolving the request could also entail the employee or administrator going to the location of the tag where the request was generated and addressing the request. The administrator can mark the request as resolved (810) or the second device can mark the issue as resolved (812). Where the administrator marks the request as resolved (810), this may occur as the second user radios back to the administrator to confirm that the request is resolved, or via telephone or SMS or other messaging system. The administrator, receiving confirmation can mark the request as resolved and update the database (814). Or, the request, being received on the second device, can allow the user of the second device to mark the issue resolved (812). That request itself can contain the ability to update the request, or the user can log in to receive access to update the request. Certainly, where the user is on a native app and receives the request, the permission may be previously granted simply through the native app, as a safety mechanism. Otherwise, it may be sufficient to resolve simply from the unique link or code sent with the request or based on receipt of login credentials to resolve the request.

In a nonlimiting illustration, in a college dorm setting, a student scans a tag affixed to a table in the common area with a first device (802), in this instance, a mobile device such as a smart phone. The scan prompts the user device to open a Web browser, URL or GUI from which the student reports that a light is out in the common area. The server creates a request to dispatch a maintenance person to replace the light bulb (804). The request is received on the second device in the possession of the maintenance person (806). In this example, the maintenance person's device is also a smart phone, but it could also be a tablet or laptop computer. The maintenance person reports to the common area and changes the light bulb (808). The maintenance person then has two options. First Option: he can contact the system administrator via SMS, MMS, text message, phone call, or two-way radio communication to report that the request has been resolved and the administrator marks the request as resolved in the system (810). Similarly, the administrator can inspect to confirm that the request has been completed and then mark the request as resolved in the system (810). Second Option: the maintenance person can mark the request complete from his second device either by scanning a tag in the common area to mark the issue resolved or by accessing the request record received on his second device in step (806) without scanning the tag and marking the issue resolved (812). The database is then updated to reflect that the light has been fixed (814). In certain embodiments, the system will then notify the first device, the second device and the administrator that the request is complete SMS or MMS notification, push notifications or e-mail. In certain embodiments, the maintenance person can scan any tag to provide access to the system to then mark the issue is resolved, instead of being required to scan the same tag as was originally scanned by the student.

Figure 9B:
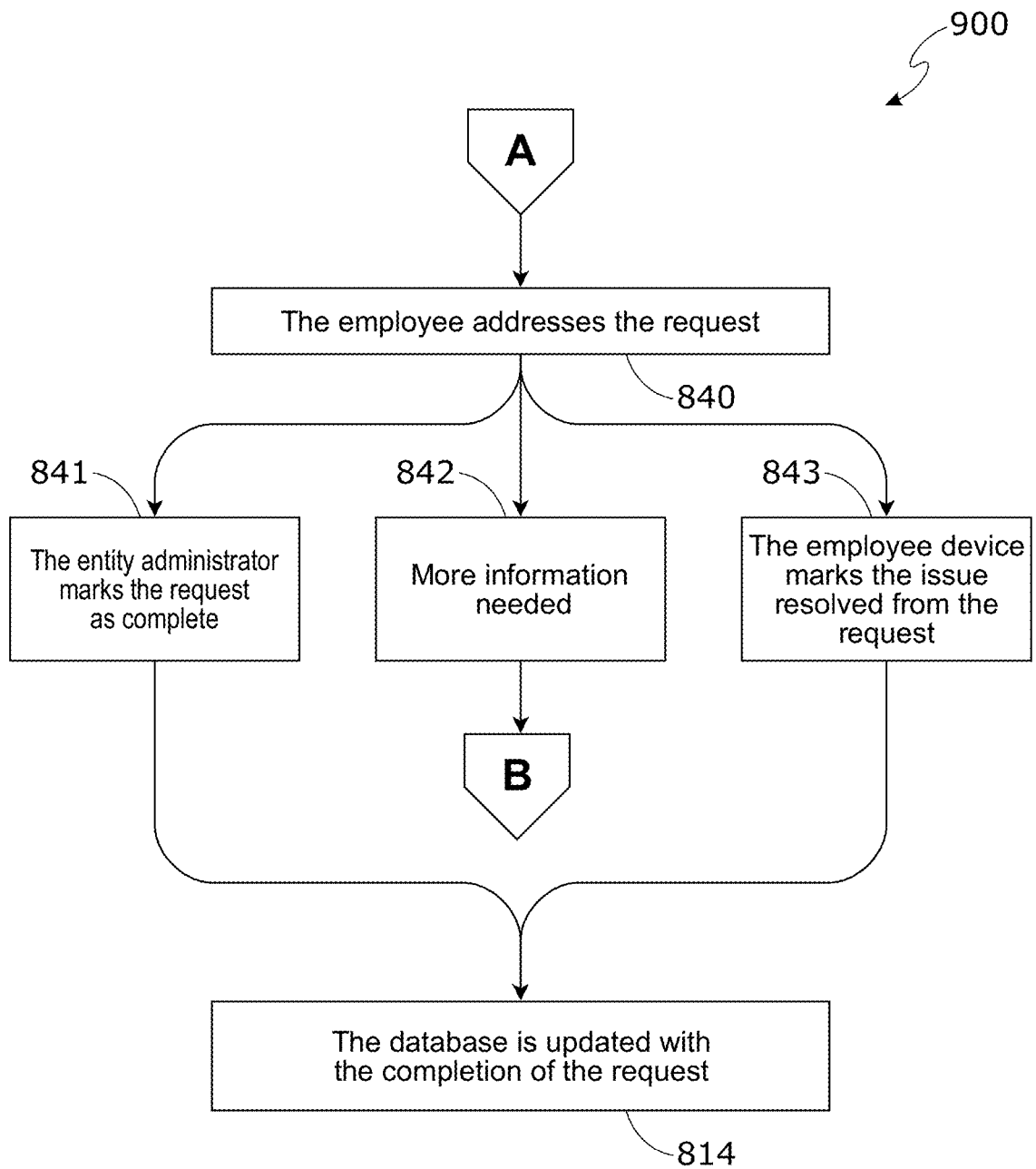

FIGS. 9A and 9B provide further clarification of these features with an administrator participating with the chain of command to resolve the issue. Beginning with FIG. 9A, which with FIG. 9B details the method of resolving the issue with an administrator (900). The first device scans the tag (802), which forces the server to create a request based on the tag scan (804). The request is received by an entity administrator via an administrative software tool (826). The administrative software can automatically generate requests and assign tasks to resolve through artificial intelligence ("AI") or machine learning (without human intervention), or human interaction, via the administrator, can be utilized to being the resolution. Thus, the administrative software tool can send a request to the data server/verification database (828), wherein the data sever/verification database identifies an employee in close proximity to the scanned tag (836). The employee who is close is elected based on their skills necessary to resolve the issue. Thus, one employee may be closer than another, but may not have the skills to resolve the issue, accordingly, as the database knows the skills and the capacity of each employee so as to find the best employee to complete the task. The data server/verification database then sends an alert to the employee device (837) or sends a radio/call or other communication to the employee (838) to give notice of the request.

Alternatively, the entity administrator identifies an employee in close proximity to the scanned tag (830). Here, the entity administrator is a person who is making decisions instead of the autonomous machine making decisions. The entity administrator then either sends an alter to the employee device (834) e.g., via SMS, MMS, push notification, e-mail, or other messaging, for example through a native app that provides direct communication between the administrator and the employee, or the entity administrator sends a radio/telephone notification to the employee (832). For example, the request being received after the scan of a tag. The administrator radios to employee x who confirms they are nearby, and the employee moves to resolve the issue (840). Upon resolution of the issue, the employee can mark the issue resolved from the request (843), or notifies of more information needed (842), for example that the employee needs parts to resolve the issue or needs another specialist to resolve the issue. Alternatively, the entity administrator can mark the request complete (841). Where more information is needed, a new request is generated (via B) to begin the process with a new employee to resolve the request, with now update information to resolve the request. Finally, the database is updated with the completion of the request (814), either via the administrator (841) or by the employee making the request as resolved (843).

In a nonlimiting illustration, tags are mounted on seats in a sports venue. A fan attending an event notices a person next to him is having a medical emergency. The fan uses his first device, in this example, a mobile device such as a smart phone, to scan the tag (802). The scan launches a Web browser, URL or GUI from which the first user can report the incident. The server creates a request based on the tag scan (804) noting the location of the tag, the date and time of the scan and the nature of the request. Nonlimiting examples of types of requests could be medical assistance, repairs and maintenance, security assistance, general concerns.

The request is received by an entity administrator via an administrative software tool. The entity administrator could be located within an office or command center located at the venue and accessing the administrative software via a desktop computer, laptop computer or tablet. Alternatively, the administrator could be roving through the venue and access the administrative software via a mobile device, tablet, or smart watch. Alternatively, the administrator could be at a remote location external to the venue and access the administrative software via a desktop computer, laptop computer, tablet, or any other computing device capable of accessing the internet.

The administrative software can be a GUI that is operated and controlled by the administrator with modules for viewing requests, the status of the request, employees on duty with their location and skill set that can be assigned to the request, completed requests and any other module or icon that is required to efficiently operate the system. Alternatively, the administrative software can utilize AI and machine learning to operate the system without the assistance of a human administrator.

Returning to step (826), when the request is received, if the administrative software is utilizing AI and machine learning without human involvement, the request is sent to the data server/verification database (828) where it is analyzed to determine the location of the request, the urgency of the request and the employee skills needed to resolve the request. In this example, the server knows that the request is a medical emergency and assigns it a higher priority and identifies that employees with first aid training are necessary to resolve the request. The data server/verification database then locates the employee closest to the seat where the tag was scanned who also has first aid training (836). The system is able to use the geolocation of the employee's device to determine which employee is closest to the request.

Once the appropriate employee is identified, the system has two options. Option One: The data server/verification database can send an alert to a third device, i.e., the employee device (837). In this instance, the third device/employee device is a mobile device such as a smart phone, but the employee device could also be a tablet, laptop computer, smart watch, smart glasses, or other wearable device. The alert could be a push notification, SMS, MMS, or e-mail. In this example, the system sends a text message to employee Mary's smart phone indicating that there is a medical emergency in Section A, Row 5, Seat 12. Mary is a registered nurse, so she is the appropriate to respond to the request since it is a medical emergency. Option Two: Since it is common for employees in venues such as this to carry one-way or two-way radios such as a walkie talkie, the system can send an alert to Mary's radio notifying her of the medical emergency occurring in Section A, Row 5, Seat 12 (838).

Returning to step (826), when the request is received, if the administrative software is being operated by a human administrator, the administrator will review the request to determine the skill set needed to respond. Via the administrative software, the administrator will then use the geolocation of the employees' devices to determine which employee with the appropriate skill set is closest in proximity to the request (830). Again, the administrator has identified that Mary is the registered nurse and is closest in proximity to the tag that was scanned to create the request.

Once the appropriate employee is identified, the system has two options. Option One: The administrator can send an alert to the third device/employee device (834). In this instance, the employee device is a mobile device such as a smart phone, but the employee device could also be a tablet, laptop computer, smart watch, smart glasses, or other wearable device. The alert could be a push notification, SMS, MMS, or e-mail. Option Two: Since it is common for employees in venues such as this to carry one-way or two-way radios such as a walkie-talkie, the administrator can call Mary on her radio or smart phone notifying her of the medical emergency occurring in Section A, Row 5, Seat 12 (832).

Regardless of how the notification is sent to the employee (837, 838, 834 or 832), the employee addresses the request (840). In this example, Mary reports to Section A, Row 5, Seat 12, and locates the person with the medical emergency. In this example, Mary determines that the person was stung by a bee. If Mary is able to resolve the request, for example, this was a simple bee sting and Mary applies antiseptic and gives the person an ice pack, Mary has two options. Option One: The employee device marks the issue resolved from the request (843). In this example, Mary can either use her device (the third device/employee device) to scan the tag and mark the request resolved (843), or Mary can access the request record received on her employee device in steps (837) or (834) without scanning the tag and marking the issue resolved (843).

Alternatively, the administrator can resolve the request by marking it complete (841). This can be done by the employee contacting the administrator via SMS, MMS, text message, phone call, or two-way radio communication to report that the request has been resolved and the administrator marking the request as resolved in the system (841), or the administrator can inspect to confirm that the request has been completed and then mark the request as resolved in the system (841).

If Mary is unable to resolve the request, for example, the person is allergic to bee stings and Mary needs the assistance of an outside EMT squad to transport the person to the hospital, Mary can use her employee device (third device) to create a new request in the system requesting additional information or assistance (842). Creating the request for additional information can be accomplished by using the employee device to scan the tag, scan any tag and access the system, accessing the request record received on the employee device in steps (837) or (834) without scanning the tag, or by communicating with the administrative software or administrator via two-way communication such as radio or phone.

Figure 10A:
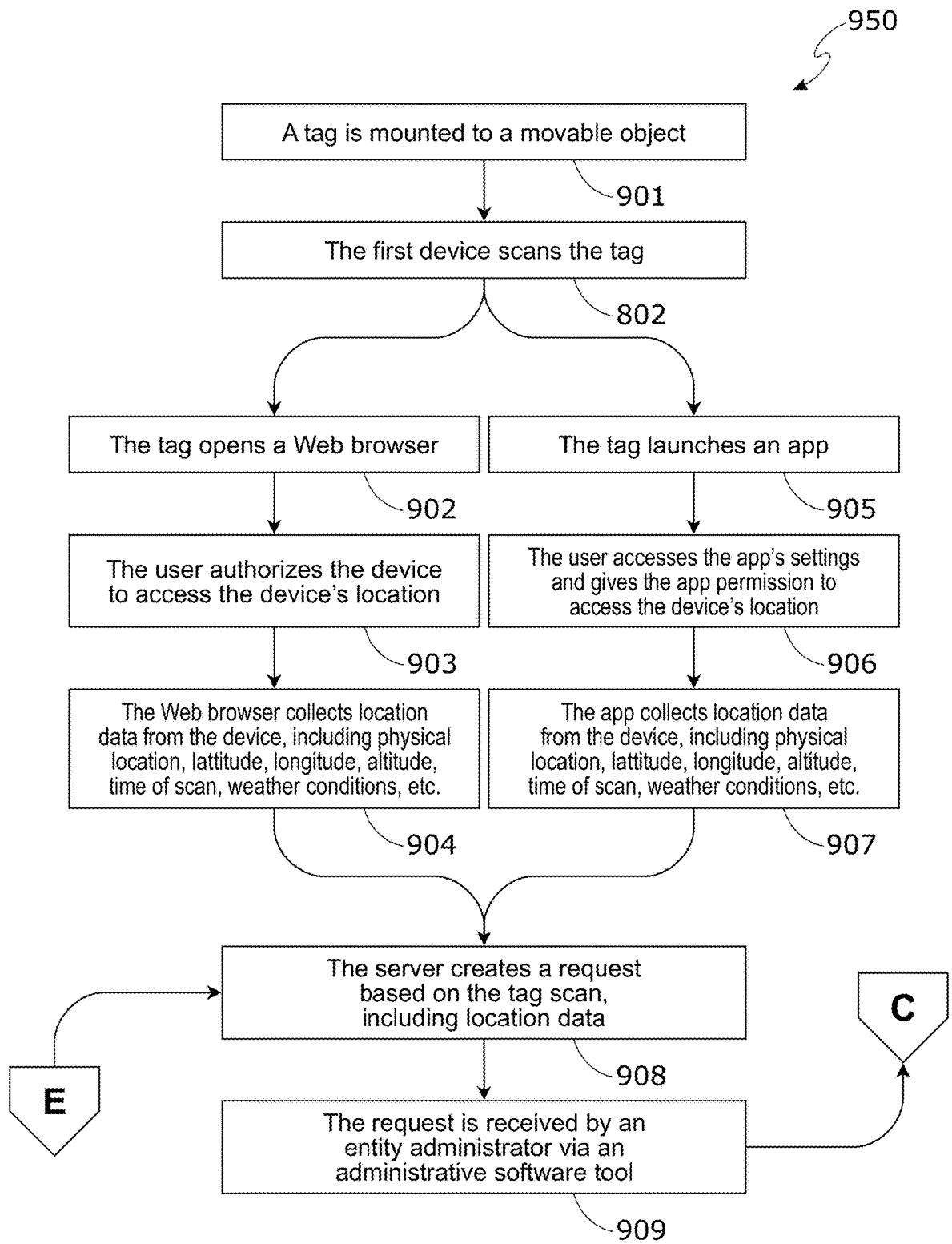
FIGS. 10A-10C depict a flow diagram identifying location data of a request from a scan on a movable object and uses location services to direct an employee to said tag location.
Figure 10B:
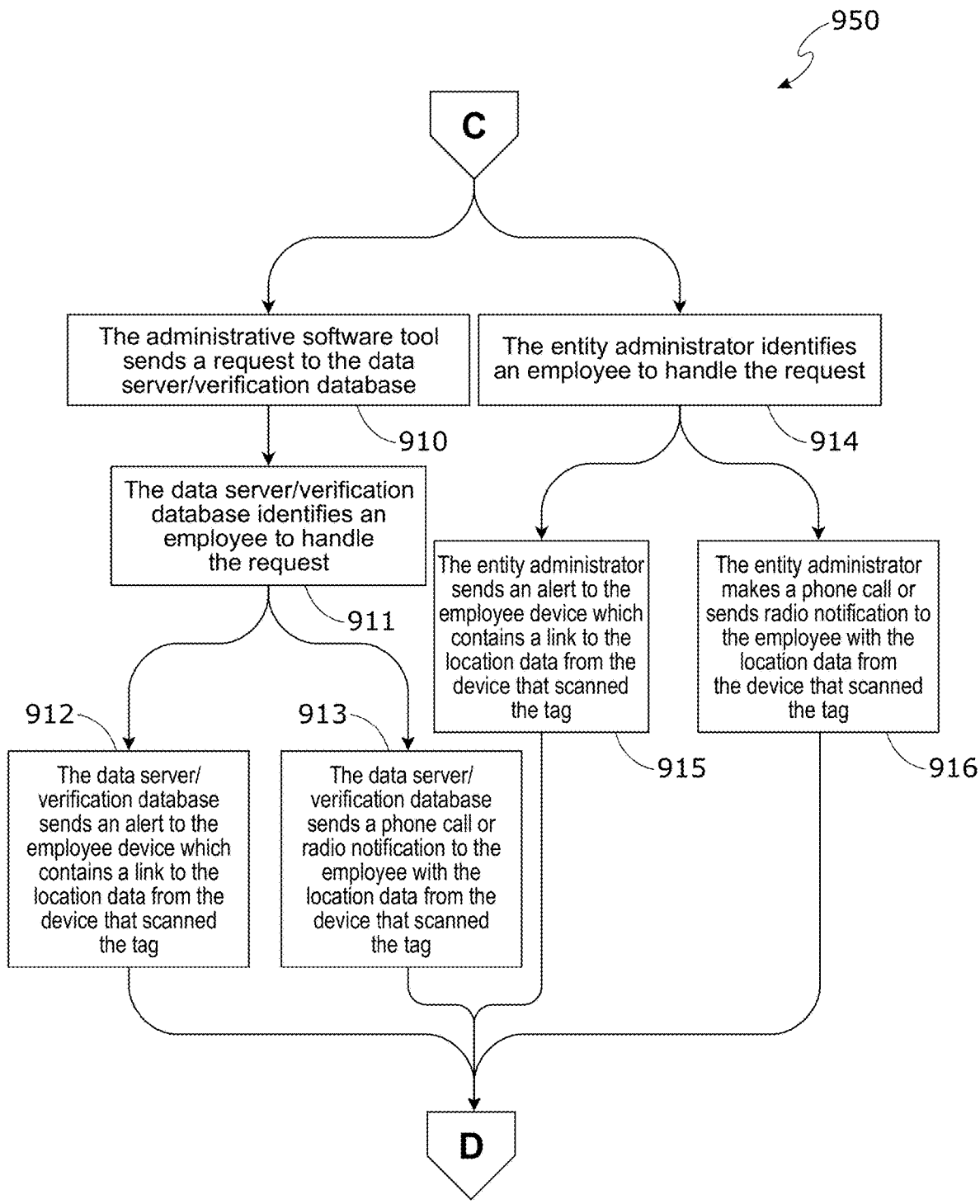
Figure 10C:
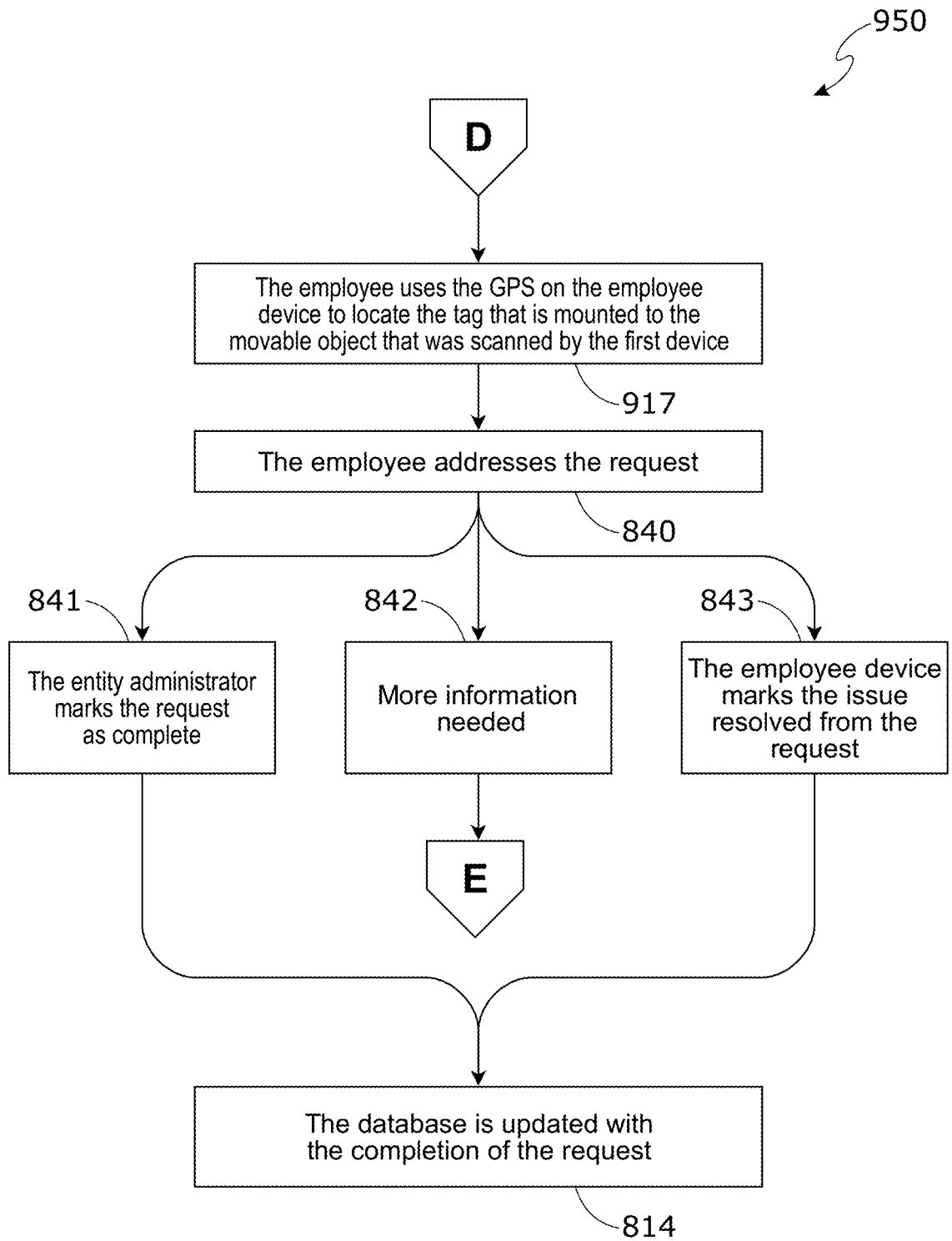

FIGS. 10A-10C detail a system employing a method regarding the resolution process for a tag mounted on a movable object (950). The first step is that a tag is mounted on said movable object (901). The first device scans the tag (802). Nonlimiting examples of a first device could be a mobile device such as a smart phone, tablet, computer such as a laptop, or a smart watch. It is preferable that the first device is GPS-enabled. This action of scanning then performs one of two steps, either the tag opens a Web browser (902) or the tag launches an app (905). If the Web browser option, the user authorizes the device to access the device's location (903), and the Web browser collects certain location data from the device, such as physical location, latitude, longitude, altitude, time of the scan, weather conditions, etc., as nonlimiting set of data that may be captured (904). Similarly, if the action opens an app, the user accesses the app's settings (or preauthorizes the settings) and gives the app permission to access the device's location (905), and then the app collects the location data (906). These options then yield where the server creates a request based on the tag scan including the location data (908).

After the request is generated, the request is received by an entity administrator via an administrative software tool (909). Two options are now presented, with the administrative software tool or an administrator (as a person) assigning tasks to be handled by employees. On one hand, the administrative software tool sends a request to the data server/verification database (910) and the data server/identification database identifies an employee to handle the request (911). To notify the employee, the data server either sends an alert to the employee device via the Web browser, URL, GUI or app which contains the request, together with a link to the location data from the device that scanned the tag (912), or the data server/verification database generates a phone call, SMS, MMS, push notification or radio notification to the employee, including the request together with the location data from the device that scanned the tag (913). In this way, the employee now is notified of the issue and also has obtained the location data to access the location of the issue to be resolved.

On the other hand, the entity administrator can manually identify an employee to handle the request (914). The entity administrator then sends an alert to the employee device via the Web browser, URL, GUI or app which contains the request together with a link to the location data from the device that scanned the tag (915), or the entity administrator makes a phone call, sends an SMS, MMS, push notification, uses a radio, or other communication protocol to notify the employee of the request and to disseminate the location data from the device that scanned the tag (916). All of these options then allow the employee to use GPS or other directional protocol or process to locate the tag that is mounted to the movable object that was scanned by the first device (917). The employee then addresses the request (840), and, where resolved, the administrator marks the request as complete (841) or the employee device marks the issue resolved from the request (843). In some cases, more information is needed (842), and this returns (via E) to step (908) to send another request to resolve the issue. If the action is complete, then the database is updated with the completion of the request (814).

In certain embodiments, in addition to the request and the location of the tag that is mounted to the movable object, the notification that is sent to the employee may contain information or links to information that may assist the employee in addressing the request such as manuals, repair protocols, troubleshooting guides, and replacement parts listings.

The above example may be utilized, for example, where a piece of heavy machinery is at an oil field, or is at a mine, and has a breakdown. A user can scan the tag mounted to the movable object with the user's mobile device, and this will both generate the request and also provide the location of the request, so that a repair team can come and service the unit. Such request may include a GUI or other form to allow the user to input additional information related to the issue. Without the location request, access to the machine may be delayed, causing loss of productivity.

In a nonlimiting illustration, Midwest Grain Company has a fleet of large farm tractors that it uses to plant, maintain, and harvest its fields located throughout Iowa. The farm's square mileage is expansive and includes many noncongruent fields. Each farm tractor in Midwest Grain Company's fleet is equipped with a tag prominently mounted somewhere on the tractor (901). The tractors are not assigned to a specific field and could therefore be used on any of the farm's fields at any time. Large pieces of equipment and machinery, like farm tractors, routinely experience problems during use. Sometimes, the piece of machinery or equipment is rendered unusable in the field and cannot be moved to return to its home base or a repair facility.

Farmer John is using a tractor to plow one of the fields when the tractor breaks down and cannot be moved back to its home base location for repair. Farmer John uses his GPS-enabled device to scan the tag on the tractor (802). In this example, Farmer John's device is a mobile device, such as a smart phone, but it could also be a smart watch, tablet or any other device which is GPS-enabled. Once the tag is scanned by the first device (802), there are two possible scenarios: the tag scan will open a Web browser, URL or GUI on the first device (902), or the tag scan will launch an app on the first device (905).

Option One: The tag scan opens a Web browser, URL or GUI on the first device (902). In this option when Farmer John uses his smart phone to scan the tag. His smart phone opens a Web browser (902) which asks Farmer John if he wants to share the location of his device. Farmer John clicks the icon authorizing the first device to access the first device's location (903). The Web browser is now able to collect data from the device such as the device's physical location including latitude and longitude, altitude, the time of the scan, weather conditions in the area and any other information that mobile devices and the like are able to capture and share (904).

Option Two: The tag launches an app on the first device (905). The app could also be executable code. Once the app is launched on the device, Farmer John clicks the icon authorizing the app to access the device's location and other data (906). Alternatively, Farmer John could access the app's settings and grant the app permission to access the device's location and data for this single use or in all instances. The app is now able to collect data from the device such as the device's physical location including latitude and longitude, altitude, the time of the scan, weather conditions in the area and any other information that mobile devices and the like are able to capture and share (907).

Regardless of whether the user device scanning the tag launches the Web browser (902) or the app (905), once location sharing is enabled and data is collected, the user makes a request via the Web browser or app on the first device. In this example, Famer John has opened a Web browser and clicked on the icon to report a repair ticket. In the repair ticket, he indicates that his tractor has broken down and is unable to return to the home base. The server then creates a request indicating that Farmer John's tractor is in need of repair (908). As part of that request, the server is able to indicate the exact GPS location of Farmer John's tractor as well as any other data associated with the tag or available from Farmer John's mobile device. For example, the tag might be coded in such a way to identify the specific year, make and model of the tractor. Or Farmer John's mobile device may report data that the scan occurred at 2:00

PM and the temperature in the field at that time was 110° which could assist the repair person in determining if environmental factors contributed to the breakdown. Without the exact GPS location of the movable object, Farmer John might need to ride to the site of the tractor's location with the repair person or try to verbally convey a complicated set of directions to the repair person describing roads that may not be marked or lack recognizable landmarks in an expansive network of nondescript, noncontiguous fields.

After the server creates the request (908), the request is received by an entity administrator via an administrative software tool (909). The entity administrator and administrative software tool could be part of an internal department of the company implementing the system. In this illustration, the entity administrator and administrative software tool could be part of Midwest Grain Company and the administrator could be working from an office at Midwest Grain Company via a desktop computer, laptop computer, tablet, mobile device, or any computing device capable of connecting to the Internet. Likewise, the administrator and administrative software tool could be part of Midwest Grain Company with the administrator located anywhere on the farm, fields or any remote location working from a laptop computer, tablet, mobile device, smart watch, or any other computing device capable of connecting to the Internet.

Alternatively, the entity administrator and administrative software tool could be external to the entity which owns the movable object to which the tag is attached. For example, Midwest Grain Company could contract repairs to County Tractor Repair. In this instance, when the server creates the request based on the tag scan (908), the request is received by an entity administrator via administrative software (909) at Country Tractor Repair rather than Midwest Grain Company.

The administrative software can be a GUI that is operated and controlled by the administrator with modules for viewing requests, the status of the request, employees on duty with their location and skill set that can be assigned to the request, completed requests and any other module or icon that is required to efficiently operate the system. Alternatively, the administrative software can utilize AI and machine learning to operate the system without the assistance of a human administrator.

Returning to step (909), when the request is received, if the administrative software is utilizing AI and machine learning without human involvement, the request is sent to the data server/verification database (910) where it is analyzed to determine the location of the request, the urgency of the request and the employee skills needed to resolve the request. In this example, the server knows that the request is for a tractor repair in a specific location in a field in Iowa sent to the server by the user device that scanned the tag on the tractor (911). The system is able to use the geolocation of the employees' devices to determine which employee is closest to the request.

Once the appropriate employee is identified, the system has two options. Option One: The data server/verification database can send an alert to the employee device (912) without human interaction. In this instance, the employee device is a mobile device such as a smart phone, but the employee device could also be a tablet, laptop computer, smart watch, smart glasses, or other wearable device. The alert could be a push notification, SMS, MMS, or e-mail. In this example, the system sends a text message to Repairman Bob, which contains a link (912). When Bob clicks on the link, it opens a Web browser, URL, GUI, or app that contains the request. Additionally, the link contains the exact location of the movable object and when Bob clicks on the link, it takes him to a GPS interface which transmits directions to Bob's mobile device so that he can locate Farmer John's tractor. The GPS interface could be a preexisting map or directions app preinstalled on Bob's phone or it could be part of the system (950) which provides direction to Bob via a Web browser, URL, GUI, or app launched by and controlled by the system. Option Two: Since it is common for employees to carry cell phones, one-way or two-way radios, or drive repair vehicles capable of receiving phone calls or radio communications, the data server/verification database, without human interaction, can call the employee and verbally provide information regarding the request and the location of the movable object (913).

Returning to step (909), when the request is received, if the administrative software is being operated by a human administrator, the administrator will review the request to determine the skill set needed to respond. Via the administrative software, the administrator will then use the geolocation of the employees' devices to determine which employee with the appropriate skill set is closest in proximity to the request (908). Again, the administrator has identified that Repairman Bob is closest in proximity to the GPS location of the tag that was scanned to create the request.

Once the appropriate employee is identified, the system has two options. Option One: The administrator can send an alert to the employee device (915). The alert will contain a link which opens a Web browser, URL, GUI, or app that contains the requests. Additionally, the link contains the exact location of the movable object and when the employee clicks on the link, it takes the employee to a GPS interface which transmits directions to the employee's mobile device so that the employee can locate the movable object. In this instance, the employee device is a mobile device such as a smart phone, but the employee device could also be a tablet, laptop computer, smart watch, smart glasses, or other wearable device. The alert could be a push notification, SMS, MMS, or e-mail. When the employee clicks on the link, it opens a Web browser, URL, GUI, or app that contains the request. Additionally, the link contains the exact location of the movable object and when the employee clicks on the link, it takes him to a GPS interface which transmits directions to the employee's mobile device so that he can locate the moveable object. The GPS interface could be a preexisting map or directions app preinstalled on the employee's phone or it could be part of the system (950) which provides direction to the employee via a Web browser, URL, GUI, or app launched by and controlled by the system. Option Two: Since it is common for employees to carry cell phones, one-way or two-way radios, or drive repair vehicles capable of receiving phone calls or radio communication, the administrator can call the employee on his smart phone or radio provide information regarding the request and the location of the movable object (916).

Regardless of how the notification is sent to the employee (912, 913, 915, or 916), the employee uses the GPS on the employee's device to locate the tag on the movable object scanned by the first device (917). In this example, Repairman Bob, clicks on the link in the SMS message sent to him by the administrator or administrative software tool which launches the standard GPS map app on Repairman Bob's phone. The app provides Repairman Bob with step-by-step directions to locate Farmer John's tractor that is broken down in the remote field.

In some embodiments, the system may send additional information to the employee device. In this example, the tag affixed to Farmer John's tractor is coded to report to the system that the tractor is a John Deere® model no. 123 So when the SMS message is sent to Repairman Bob's phone, there is also a link to a repair manual for this particular tractor.

Once the employee reaches the location of the movable object, the employee addresses the request (840). In this example, when Repairman Bob reaches the tractor, he determines the tractor is broken down because the engine is not receiving fuel. If Bob is able to resolve the request, for example, the tractor is simply out of fuel, Bob has two options. Option One: The employee device marks the issue resolved from the request (843). In this example, Bob can either use his device to scan the tag on the movable object and mark the request resolved (843), or Bob can access the request record received on his employee device in steps (912) or (915) without scanning the tag and mark the issue resolved (843).

Alternatively, the administrator can resolve the request by marking it complete (841). This can be done by the employee contacting the administrator via SMS, MMS, text message, e-mail, phone call, or two-way radio communication to report that the request has been resolved and the administrator marking the request as resolved in the system (841), or the administrator can inspect to confirm that the request has been completed and then mark the request as resolved in the system (841).

If Repairman Bob is unable to resolve the request, for example, the tractor needs a new fuel pump and the part must be ordered, Bob can use his employee device to create a new request in the system requesting additional information or assistance (842). Creating the request for additional information can be accomplished by using the employee device to scan the tag on the movable object, accessing the request record received on the employee device in steps (912) or (915) without scanning the tag, or by communicating with the administrative software or administrator via two-way communication such as radio or phone, sending a SMS, MMS, or e-mail.

In some embodiments, the alert or request sent in steps (912) or (915) might contain additional links to assist in addressing the request. For example, the request sent to Repairman Bob might contain a link to order parts for the tractor. In other embodiments, the employee can scan the tag on the moveable object to access additional information from the system. In this example, when Repairman Bob scans the tag on the tractor, can access the blockchain repair records for the tractor to see the history of previous repairs made to the tractor.

Figure 11C:
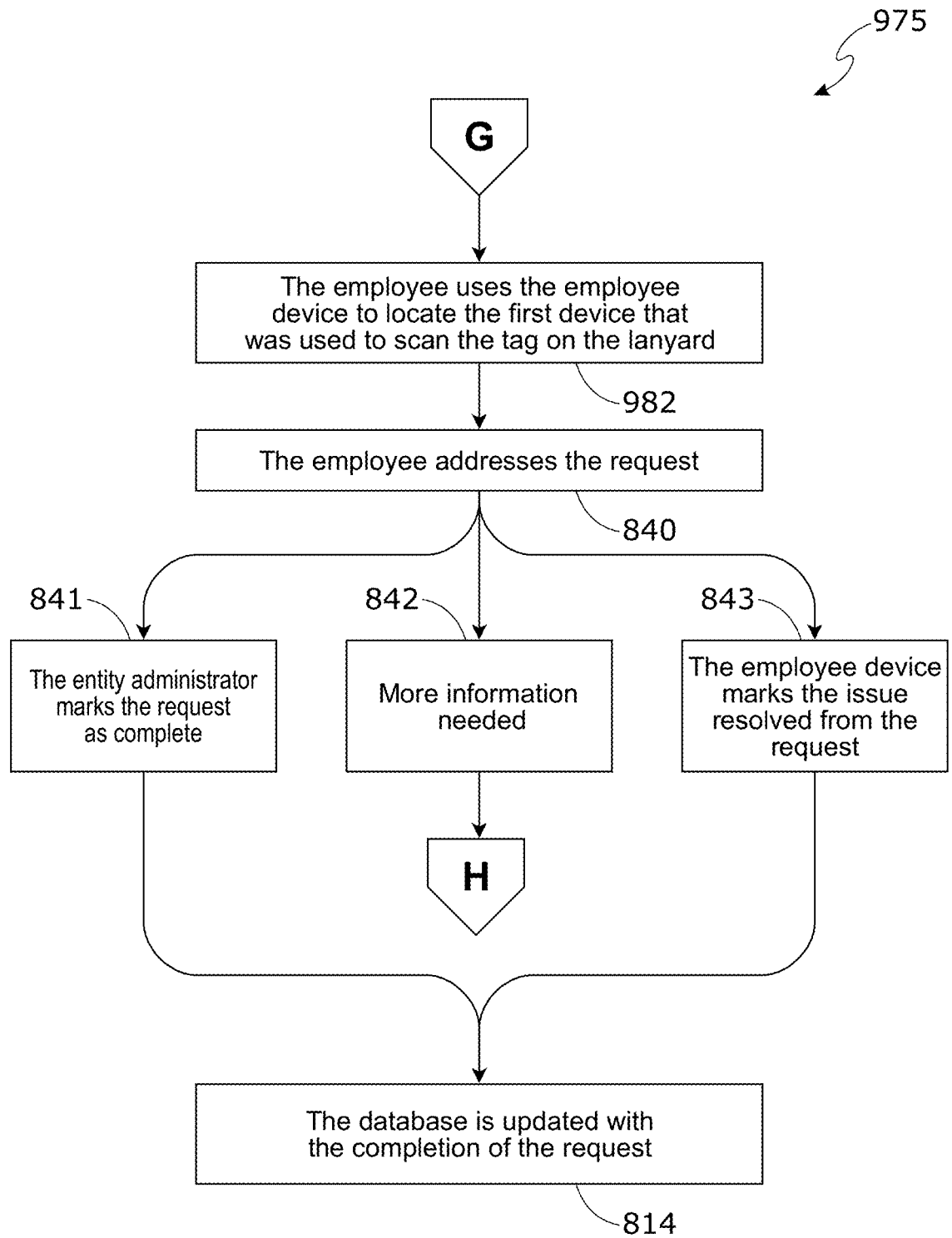

In a further example, as detailed in FIGS. 11A-11C, the device itself becomes the beacon for location purposes. Accordingly, the system (975) details wherein a tag is mounted to a lanyard (976) or similar mobile aspect, such as a badge, or movable object. For example, a person at a concert might carry credentials on a lanyard, and a tag is positioned on said lanyard and worm by a user (977). The user scans the tag on the lanyard with a first device (978). Nonlimiting examples of a first device could be a mobile device such as a smart phone, tablet, computer such as a laptop, other GPS-enabled device, or a smart watch. It is preferable that the first device is GPS-enabled. For example, the user is having a health issue and scans the tag to report the issue. Upon scanning, a Web browser (902), URL, GUI, or an app (905) is opened, with the user authorizing the device to access the device's location (903) or the app settings are accessed and permission is granted to access the device's location (906). In some cases, the app has preauthorized the access to location. Upon receipt, the server creates a request based on the tag scan (979). The first device, having authorized the location, acts as a beacon, sending GPS or other positioning location coordinates to a server (980). The server associates the continuous or variable feed of GPS location coordinates to the request (981). The request is received by an entity administrator via an administrative software tool (909), wherein the administrator identifies an employee to handle the request (914), or the administrative software sends a request to the data sever/verification database (910), wherein the data server/verification database identifies an employee in close proximity to the scanned tag to handle the request (911).

Several options occur where the data server/verification database sends an alert to the employee device via SMS, MMS, push notification, or e-mail which launches a Web browser, URL or GUI to track the feed of the GPS location of the first device (912) together with the details of the request. Alternatively, this can be performed in an app (913) that is launched on an employee device. Similarly, the entity administrator can manually send an alert to the employee device via SMS, MMS, push notification, or e-mail to open a Web browser, URL or GUI to track the feed of the GPS location of the first device (915) or the employee can track the first device via an app to track the feed of the GPS (916). The employee is now in possession of the location of the device that was used to scan the tag mounted to the lanyard and of a second device in the employee's possession which is capable of tracking the location so as to direct the employee to that location (982). Once the employee successfully locates the device that scanned the tag mounted to the lanyard, the employee addresses the request (840) and the request either is resolved by an administrator (841), the employee device marks the issues as resolved from the request (843) or more information is needed (842). Where more information is needed (842), a return (via H) to step (979) is necessary to restart the process. Otherwise, upon completion, the database is updated with the completion of the request (814).

In a nonlimiting illustration, a group of friends is attending a large, multiday outdoor music festival with onsite camping. The venue is a sprawling field comprised of hundreds of acres. Each attendee is given a lanyard which acts as their ticket to the event. A tag is mounted to the lanyard (976). The lanyard is worn by the attendee (977).

In the middle of the night, one of the friends, Amy, leaves the campsite in search of bathroom facilities. It is dark and Amy quickly becomes disoriented and finds herself in a remote area of the festival grounds. Another intoxicated festival attendee begins following Amy. Amy feels threatened so she uses her user device, in this instance, a mobile device such as a smart phone, to scan the tag on her lanyard (978). The user device could also be a smart watch, tablet or any other device which is GPS-enabled. Once the tag is scanned by the first device (978), there are two possible scenarios: the tag scan will open a Web browser, URL, or GUI on the first device (902), or the tag scan will launch an app on the first device (905).

OPTION ONE: The tag scan opens a Web browser, URL, or GUI on the first device (902). In this option, when Amy uses her smart phone to scan the tag, her smart phone opens a Web browser (902) which asks Amy if she wants to share the location of her device. Amy clicks the icon authorizing the first device to access the device's location (903). The Web browser is now able to collect data from the device such as the device's physical location including latitude and longitude, altitude, the time of the scan, weather conditions in the area and any other information that mobile devices and the like are able to capture and share. The Web browser is also able to continually access the device's location at any given moment in time.

OPTION Two: The tag launches an app on the first device (905). The app could also be executable code. Once the app is launched on the device, Amy clicks the icon authorizing the app to access the device's location and other data (906). Alternatively, Amy could access the apps settings and grant the app permission to access the device's location and data for this single use or in all instances. The app is now able to collect data from the device such as the device's physical location including latitude and longitude, altitude, the time of the scan, weather conditions in the area and any other information that mobile devices and the like are able to capture and share. The app is also able to continually access the device's location at any given moment in time.

Regardless of whether the user device scanning the tag launches the Web browser (902) or the app (905), once location sharing is enabled and data is collected, the user makes a request via the Web browser or the app. In this illustration, Amy indicates that she is being followed and needs assistance from security. The server creates a request based upon Amy's tag scan (979). Due to the nature of the venue, it could take time for security to locate Amy at the location where she initially scanned the tag on her lanyard with her device (978). Amy knows that it would be advantageous to continue to move away from the intoxicated festival attendee and try to find her campsite. However, since Amy has authorized the system to access the location of her device, Amy's smart phone now acts like a beacon sending a feed, either continuous or noncontinuous of Amy's GPS location to the server (980) regardless of where Amy moves from her original location.

The server associates this GPS location coordinates feed from the user device to the request (981). The request is received by an entity administrator via an administrative software tool (909).

Returning to step (909), when the request is received, if the administrative software is utilizing AI and machine learning without human involvement, the request is sent to the data server/verification database (910) where it is analyzed to determine the location of the request, the urgency of the request and the employee skills needed to resolve the request. In this example, the server knows that the request is safety emergency and assigns it a higher priority and identifies that employees with security training are necessary to resolve the request. The data server/verification database then locates the employee in the closest proximity to the current location of the continuous GPS feed from the user device that was used to scan the tag affixed to the lanyard (911). The system is able to use the geolocation of the employee's device to determine which employee is closest to the request.

Once the appropriate employee is identified, the system has two options. Option One: The data server/verification database can send an alert to the employee device, without human involvement, which contains a link to the request and to launch a Web browser to track the continuous feed of the GPS location of the first device (912). In this instance, the employee device is a mobile device such as a smart phone, but the employee device could also be a tablet, laptop computer, smart watch, smart glasses, or other wearable device. The alert could be a push notification, SMS, MMS, or e-mail. When the employee clicks on the link, it opens a Web browser, URL, or GUI that contains the requests. Additionally, the link contains the exact location of the device that scanned the tag on the lanyard at any given moment in time and when the employee clicks on the link, it takes him to a GPS interface which transmits a graphical representation of the user device as a moving beacon overlayed on a map of the venue. The GPS interface could also be a preexisting map or directions app preinstalled on the employee's phone or it could be part of the system (975) which provides direction to current location of the user device acting as a beacon via a Web browser, URL, or GUI launched by and controlled by the system.

In this example, the system sends a text message to Security Guard Sam's smart phone indicating Amy is in danger and of need of assistance. When Sam clicks on the link it opens a Web browser on which the system continuously transmits Amy's location within the venue to Security Guard Sam's employee device.

Option Two: The data verification server/verification database sends an alert to the employee device, without human involvement which launches a system (975) app to track the continuous feed to the GPS location of the device that was used to scan the tag affixed to the lanyard (913).

Returning to step (909), when the request is received, if the administrative software is being operated by a human administrator, the administrator will review the request to determine the skill set needed to respond. Via the administrative software tool, the administrator will then use the geolocation of the employees' devices to determine which employee with the appropriate skill set is closest in proximity to the request (979). Again, the administrator has identified that Security Guard Sam is closest in proximity to the current location of the continuous GPS feed of the device that was used to scan the tag on the lanyard in step (978).

Once the appropriate employee is identified, the system has two options. Option One: The administrator can send an alert to the employee device which contains a link to the request and to launch a Web browser to track the continuous feed of the GPS location of the first device (915) that scanned the tag on the lanyard at any given moment in time. When the employee clicks on the link, it takes him to a GPS interface which transmits a graphical representation of the user device as a moving beacon overlayed on a map of the venue. The GPS interface could also be a preexisting map or directions app preinstalled on the employee's phone or it could be part of the system (975) which provides direction to the via a Web browser, URL, or GUI launched by and controlled by the system. Option Two: The data verification server/verification database sends an alert to the employee device which launches a system (975) app to track the continuous feed to the GPS location of the device that was used to scan the tag affixed to the lanyard (916).

Regardless of how the notification is sent to the employee (912, 913, 915, or 916), the employee uses the employee's device to locate the first device that was used to scan the tag on the lanyard (982). In this instance, Security Guard Sam has opened a Web browser on his smart phone. The Web browser contains a detailed map of the venue. On the map, Amy's device is represented by a blue dot and Sam's device is represented by a red dot. As Amy moves throughout the venue, her dot moves. Sam can continue to track Amy's movements on his device until he is able to locate her.

In another embodiment, the Web browser, containing a detailed map of the venue, is used by the administrator. On the map, Amy's location is indicated by a blue dot and Security Guard Sam's location is represented by a red dot. The administrator monitors the location and proximity of the two devices and using a form of one-way or two-way communication, such as a phone call, radio, or text message, the administrator guides Sam to Amy's location.

Once the employee reaches the device used to scan the tag on the lanyard, the employee addresses the request (840). In this example, when Security Guard Sam reaches Amy, the intoxicated festival attendee following Amy flees the scene. Since Sam was able to resolve the request, he has two options. Option One: The employee device marks the issue resolved from the request (843). In this example, Sam can either use his device to scan the tag on Amy's lanyard and mark the request resolved (843), or Sam can access the request record received on his employee device in steps (912) or (915) without scanning the tag or otherwise logging into the system and marks the issue resolved (843).

Alternatively, the administrator can resolve the request by marking it complete (841). This can be done by the employee contacting the administrator via SMS, MMS, text message, e-mail, phone call, or two-way radio communication to report that the request has been resolved and the administrator marking the request as resolved in the system (841), or the administrator can inspect to confirm that the request has been completed and then mark the request as resolved in the system (841).

If Security Guard Sam is unable to resolve the request, for example, Sam has apprehended the intoxicated festival attendee but needs the assistance of the local police to make the arrest, Sam can use his employee device to create a new request in the system requesting additional information or assistance (842). Creating the request for additional information can be accomplished by using the employee device to scan the tag on the lanyard, accessing the request record received on the employee device in steps (912) or (915) without scanning the tag or otherwise logging into the system, or by communicating with the administrative software or administrator via two-way communication such as radio or phone.

It will be appreciated that the embodiments and illustrations described herein are provided by way of example, and that the present invention is not limited to what has been particularly disclosed. Rather, the scope of the present invention includes both combinations and subcombinations of the various features described above, as well as variations and modifications thereof that would occur to persons skilled in the art upon reading the forgoing description and that are not disclosed in the prior art.

What is claimed is:

1. A system for contactless communication comprising:
   a. a network of scannable tags, each tag in the network associated with a unique tag identifier and a point of interest proximate to the tag;
   b. a remote server having a computer processor and a computer memory;
   c. a database operatively connected to the remote server, the database containing information relating to each tag in the network, information for each tag including:
      i. the associated unique tag identifier and the point of interest;
      ii. content to be sent to a mobile device in response to being scanned by the mobile device, the content to include a link for a request regarding the content; and
      iii. a status indicator to indicate a status regarding the content; and
   d. wherein the computer memory of the remote server stores executable code which, when executed, enables the remote server to perform a process comprising:
      i. delivering requested content to a user mobile device that has sent a request for content upon scanning a particular tag in the network of tags;
      ii. in response to receiving a request regarding the content from the user mobile device, sending an issue alert to an employee device to notify the employee device about the request for the content, the employee device receiving the issue alert already logged into the system; and
      iii. updating the status indicator for the particular tag to indicate that the request for the content has been addressed and that the issue alert has been sent.

2. The system of claim 1 wherein in response to receiving a request to update the status indicator for the particular tag, updating the status indicator further comprises updating the status indicator for the particular tag to indicate that the request regarding the content is resolved.

3. The system of claim 2 wherein the request to update the status indicator for the particular tag is received from an administrator device.

4. The system of claim 2 wherein the request to update the status indicator for the particular tag is received from the employee device that received the issue alert, an employee device that did not receive the issue alert, a nonemployee device, the user mobile device, or combinations thereof.

5. The system of claim 1 further comprising monitoring a status of the request regarding the content and sending a notice to the user mobile device to see if the request regarding the content has been resolved.

6. The system of claim 5 further comprising sending a communication to the same employee device that received the issue alert, a different employee device that did not receive the issue alert, or both, the communication to indicate that the request regarding the content has not been resolved.

7. The system of claim 1 further comprising receiving a photo, text, or both together with the request regarding the content and uploading the photo, text, or both to the database in association with the particular tag.

8. The system of claim 1 wherein the network of scannable tags includes scannable tags selected from the group consisting of: quick response (QR) code tags, near-field communication (NFC) tags, radio-frequency identification (RFID) tags, and combinations thereof.

9. The system of claim 1 wherein the request regarding the content includes reporting an engagement opportunity selected from the group consisting of: providing feedback, closing a bill, ordering, purchasing, payment, and combinations thereof.

10. The system of claim 1 further comprising receiving from an administrative device a plurality of groupings of tags within the network of tags, one grouping in the plurality to include a master tag and the particular tag, and wherein updating the status indicator for the master tag also updates the status indicator for the particular tag.

11. The system of claim 1 further comprising receiving a request from an administrator device to redirect the mobile device to alternative content in response to scanning a tag in the network of tags with the mobile device.

12. The system of claim 1 further comprising receiving a triggering event to be associated with one or more tags in the network of tags from an administrator device, the triggering event, if it occurs, to cause the system to send additional content to each user mobile device that has scanned at least one tag in the network of tags and that is associated with the triggering event.

* * * * *